US010684795B2

(12) United States Patent
Kojima

(10) Patent No.: US 10,684,795 B2
(45) Date of Patent: Jun. 16, 2020

(54) STORAGE DEVICE AND STORAGE CONTROL METHOD

(71) Applicant: Toshiba Memory Corporation, Tokyo (JP)

(72) Inventor: Yoshihisa Kojima, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/658,316

(22) Filed: Jul. 24, 2017

(65) Prior Publication Data

US 2018/0024779 A1     Jan. 25, 2018

Related U.S. Application Data

(60) Provisional application No. 62/366,457, filed on Jul. 25, 2016.

(51) Int. Cl.
| *G06F 12/00* | (2006.01) |
| *G06F 3/06* | (2006.01) |
| *G06F 12/109* | (2016.01) |
| *G06F 12/02* | (2006.01) |

(52) U.S. Cl.
CPC .......... *G06F 3/0659* (2013.01); *G06F 3/0604* (2013.01); *G06F 3/0679* (2013.01); *G06F 12/0246* (2013.01); *G06F 12/109* (2013.01); *G06F 12/00* (2013.01); *G06F 2212/1016* (2013.01); *G06F 2212/1041* (2013.01); *G06F 2212/608* (2013.01); *G06F 2212/657* (2013.01); *G06F 2212/7201* (2013.01); *G06F 2212/7205* (2013.01); *G06F 2212/7208* (2013.01)

(58) Field of Classification Search
CPC ...................................................... G06F 12/00
USPC ........................................................ 711/103
See application file for complete search history.

(56) References Cited

U.S. PATENT DOCUMENTS

| 6,292,807 | B1 * | 9/2001 | Larson ................ G06F 13/1615 |
| 8,595,411 | B2 | 11/2013 | Selinger et al. |
| 9,798,631 | B2 * | 10/2017 | Mickens ................. G06F 3/061 |
| 2008/0126602 | A1 * | 5/2008 | Biran ...................... G06F 13/28 710/22 |
| 2008/0282245 | A1 * | 11/2008 | Kubo ...................... G06F 3/061 718/101 |
| 2011/0126045 | A1 * | 5/2011 | Bennett ............... G06F 11/1068 714/6.22 |
| 2012/0072644 | A1 * | 3/2012 | Asano ................. G06F 12/0246 711/103 |
| 2013/0290601 | A1 * | 10/2013 | Sablok ............... G06F 12/0246 711/103 |
| 2014/0059275 | A1 * | 2/2014 | Yun ..................... G06F 12/0246 711/103 |

(Continued)

*Primary Examiner* — Gautam Sain
(74) *Attorney, Agent, or Firm* — Kim & Stewart LLP

(57) ABSTRACT

A storage device includes a nonvolatile semiconductor memory and a controller. The nonvolatile semiconductor memory includes a first region and a second region. The controller classifies a plurality of read requests for reading data from the nonvolatile semiconductor memory into first read requests for reading data from the first region and second read requests for reading data from the second region, pairs one of the first read requests with one of the second read requests to generate a third read request, and outputs the third read request to the nonvolatile semiconductor memory.

23 Claims, 18 Drawing Sheets

(56) References Cited

U.S. PATENT DOCUMENTS

| | | | |
|---|---|---|---|
| 2014/0089568 A1 | 3/2014 | Chung et al. | |
| 2014/0092683 A1* | 4/2014 | Hyun | G11C 16/32 365/185.09 |
| 2015/0220439 A1* | 8/2015 | Mickens | G06F 3/061 711/135 |
| 2015/0380097 A1 | 12/2015 | Sato et al. | |
| 2016/0179402 A1* | 6/2016 | Iwashiro | G06F 3/0611 711/103 |
| 2016/0266934 A1* | 9/2016 | Rimoni | G06F 9/4881 |
| 2016/0283111 A1* | 9/2016 | Guo | G06F 3/061 |
| 2017/0160976 A1* | 6/2017 | Thangaraj | G06F 3/0634 |
| 2017/0269873 A1* | 9/2017 | Tan | G06F 3/0619 |
| 2017/0300249 A1* | 10/2017 | Geml | G06F 3/0619 |

* cited by examiner

FIG. 18

| WORD LINE NUMBER | 0 | 1 | 2 | 3 | ... | 126 | 127 |
|---|---|---|---|---|---|---|---|
| UPPER PAGE | 1 | 3 | 5 | 7 | ... | 253 | 255 |
| LOWER PAGE | 0 | 2 | 4 | 6 | ... | 252 | 254 |

FIG. 19

| WORD LINE NUMBER | 0 | 1 | 2 | 3 | ... | 126 | 127 |
|---|---|---|---|---|---|---|---|
| UPPER PAGE | 2 | 4 | 6 | 8 | ... | 254 | 255 |
| LOWER PAGE | 0 | 1 | 3 | 5 | ... | 251 | 253 |

FIG. 20

| WORD LINE NUMBER | 0 | 1 | 2 | 3 | ... | 126 | 127 |
|---|---|---|---|---|---|---|---|
| UPPER PAGE | 2 | 5 | 8 | 11 | ... | 380 | 383 |
| MIDDLE PAGE | 1 | 4 | 7 | 10 | ... | 379 | 382 |
| LOWER PAGE | 0 | 3 | 6 | 9 | ... | 378 | 381 |

FIG. 21

| WORD LINE NUMBER | 0 | 1 | 2 | 3 | ... | 126 | 127 |
|---|---|---|---|---|---|---|---|
| UPPER PAGE | 5 | 8 | 11 | 14 | ... | 382 | 383 |
| MIDDLE PAGE | 2 | 4 | 7 | 10 | ... | 379 | 381 |
| LOWER PAGE | 0 | 1 | 3 | 6 | ... | 375 | 378 |

STORAGE DEVICE AND STORAGE CONTROL METHOD

CROSS-REFERENCE TO RELATED APPLICATION(S)

This application claims the benefit of priority from U.S. Provisional Application No. 62/366,457, filed on Jul. 25, 2016, the entire contents of which are incorporated by reference herein.

FIELD

Embodiments described herein relate generally to a storage device and a storage control method.

BACKGROUND

A storage device is configured to read data from a nonvolatile memory having a plurality of planes.

BRIEF DESCRIPTION OF THE DRAWINGS

FIG. 18 is a diagram illustrating page addressing in a full sequence of the MLC.

FIG. 19 is a diagram illustrating page addressing in an LM sequence of the MLC.

FIG. 20 is a diagram illustrating page addressing in a full sequence of a TLC.

FIG. 21 is a diagram illustrating page addressing in a foggy-fine sequence of the TLC.

DETAILED DESCRIPTION

According to some embodiments, a storage device includes a nonvolatile semiconductor memory and a controller. The nonvolatile semiconductor memory includes a first region and a second region. The controller classifies a plurality of read requests for reading data from the nonvolatile semiconductor memory into first read requests for reading data from the first region and second read requests for reading data from the second region, pairs one of the first read requests with one of the second read requests to generate a third read request, and outputs the third read request to the nonvolatile semiconductor memory.

Hereinafter, a storage device and a storage control method of an embodiment will be described with reference to the accompanying drawings.

First Embodiment

Figure 1:
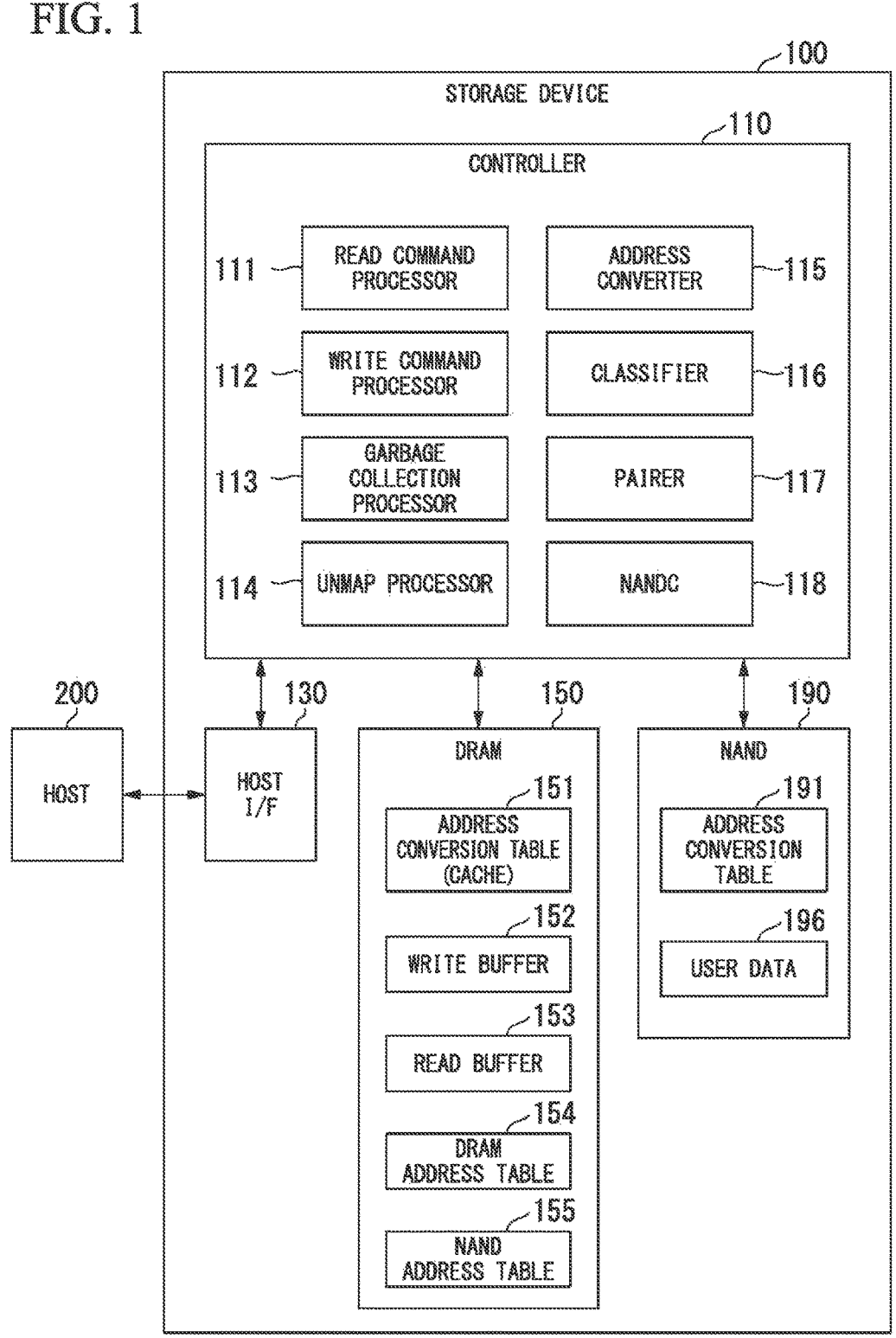
FIG. 1 is a diagram illustrating an example of a storage device according to a first embodiment.

FIG. 1 is a diagram illustrating an example of a storage device according to a first embodiment. First, an overview of the storage device 100 will be described with reference to FIG. 1. The storage device 100 is, for example, a solid state drive (SSD), but not limited thereto.

The storage device 100 is connected to a host device (hereinafter referred to as "host") 200 so that the storage device 100 can communicate with the host 200. The host 200 transmits a command such as a read command or a write command to the storage device 100. The "read command" is a command for reading information from the storage device 100. The "write command" is a command for writing information to the storage device 100.

The storage device 100 includes a controller 110, a host I/F 130, a dynamic random access memory (DRAM) 150, and a NAND memory (NAND) 190, but is not limited to this configuration. The host I/F 130 transmits the command received from the host 200 to the controller 110, and transmits data received from the controller 110 to the host 200.

For example, the host I/F 130 receives a command (for example, a read command or a write command) for accessing the NAND 190 or the DRAM 150 from the host 200. The controller 110 generates a plurality of read requests based on the command received by the host I/F 130, and generates a multi-plane read request by pairing the plurality of read requests. The multi-plane read request will be described in detail below.

The controller 110 is realized by a processor such as a central processing unit (CPU) executing a program stored in a program memory. The controller 110 may be partially or entirely realized by hardware such as a large scale integration (LSI), an application specific integrated circuit (ASIC), and a field-programmable gate array (FPGA) having the same function as the function of the processor executing a program.

The controller 110 may include the following processing units: a read command processor 111, a write command processor 112, a garbage collection processor 113, an UNMAP processor 114, an address converter 115, a classifier 116, a pairer 117, and a NAND controller (NANDC) 118, but is not limited thereto.

The processing units 111 to 118 are realized by a processor such as a CPU executing a program stored in the program memory. The processing units 111 to 118 may be realized by hardware such as an LSI, an ASIC, and an FPGA having the same function as the function of the processor executing their respective programs.

The read command processor 111 generates a read request for reading data from the NAND 190 based on the read command received from the host I/F 130. The write command processor 112 generates a write request for writing data to the NAND 190 based on the write command received from the host I/F 130. The garbage collection processor 113, the UNMAP processor 114, the address converter 115, the classifier 116, and the pairer 117 will be described in detail below.

The NAND 190 is a nonvolatile semiconductor memory, and stores at least an address conversion table 191 and user data 196. The address conversion table 191 is a table that is used to convert a logical address included in the command transmitted from the host into a physical address on the corresponding NAND 190. The user data 196 is, for example, data generated through a process of the host 200. The user data 196 includes data requested to be written to the NAND 190 by the write command, and data already written to the NAND 190 based on the write command.

The NANDC 118 controls reading of data from the NAND 190 and writing of data to the NAND 190. The DRAM 150 stores a portion of the address conversion table 191 stored in the NAND 190 as an address conversion table (cache) 151. The entire address conversion table 191 is not stored in the DRAM 150 because the DRAM 150 is more expensive per unit capacity than the NAND 190. The DRAM 150 includes a write buffer 152 and a read buffer 153. The write buffer 152 temporarily stores data to be written to the NAND 190. The read buffer 153 temporarily stores data to be transmitted to the host 200. The DRAM 150 may be partially or entirely replaced with, for example, a static random access memory (SRAM).

Figure 2:
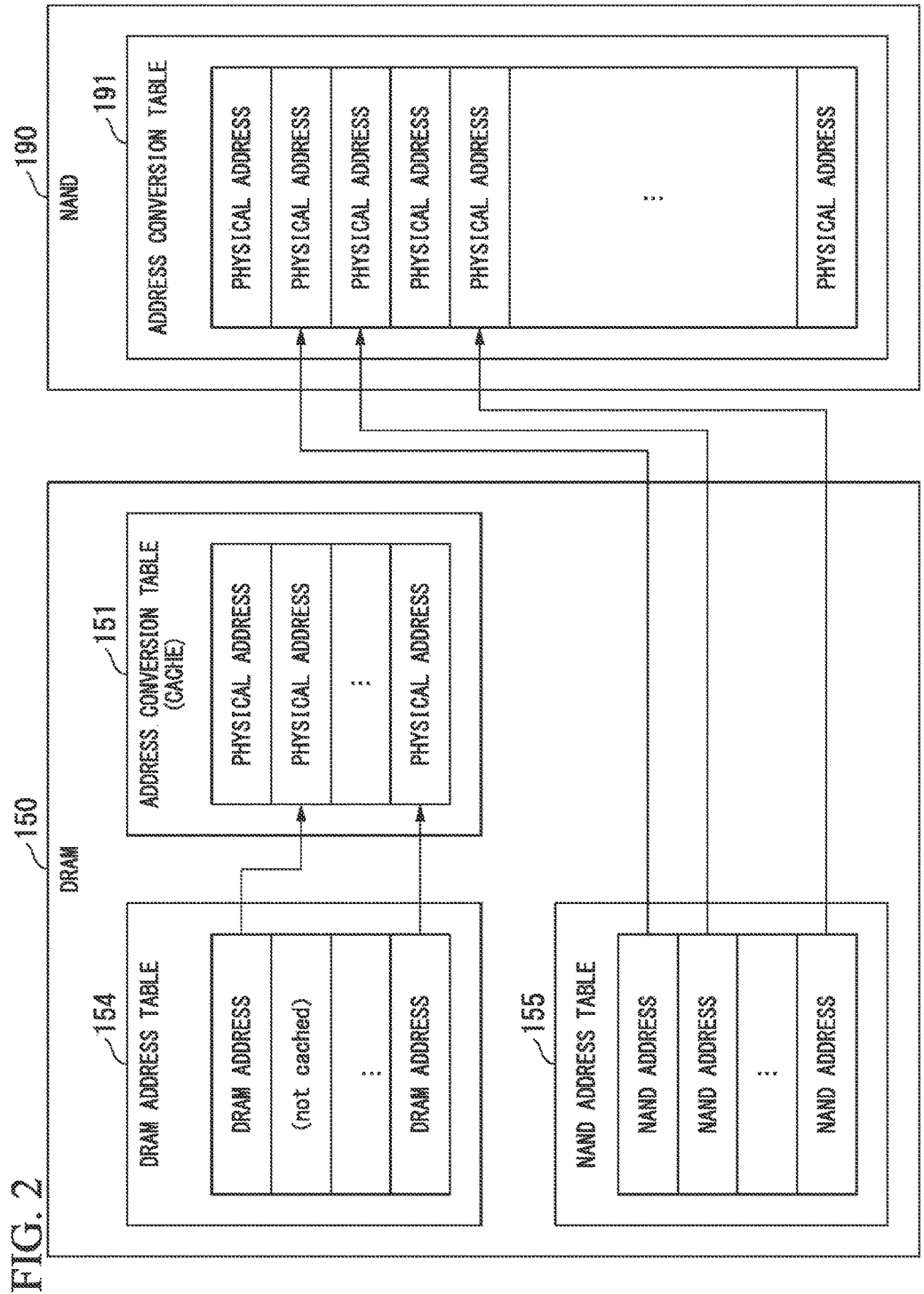
FIG. 2 is a diagram illustrating an example of tables stored in DRAM and in NAND memory of the first embodiment.

FIG. 2 is a diagram illustrating an example of tables stored in the DRAM and in the NAND memory of the first embodiment. The NAND 190 stores the address conversion table 191. A physical address indicating a physical location of the user data stored in the NAND 190 is stored in the address conversion table 191.

The DRAM 150 stores the address conversion table (cache) 151, a DRAM address table 154, and a NAND address table 155. The address conversion table (cache) 151 includes portions, in particular sub-tables, of the address conversion table 191 stored in the NAND 190, as described above. The sub-table of the address conversion table is a table including a plurality of physical addresses in which logical addresses are consecutive, and is a portion of the address conversion table 191. Hereinafter, the term 'sub-table' and the term 'portion' of the address conversion table 191 or the address conversion table (cache) 151 are used interchangeably. Further, a sub-table (or a portion) included in the address conversion table may be simply referred to as 'the address conversion table' depending on the context. The addresses (DRAM addresses) in the DRAM 150 of the sub-table of the address conversion table stored in the address conversion table (cache) 151 are stored in the DRAM address table 154, in an order of logical addresses. Further, in a case where the sub-table of the address conversion table corresponding to a logical address is not stored in the address conversion table (cache) 151, information indicating that the cache does not exist (not cached) is stored in the DRAM address table 154. The sub-table of the address conversion table stored in the address conversion table 191, and the address (NAND address) in the NAND 190 are stored in the NAND address table 155 in an order of logical addresses.

For example, when the read command is input to the controller 110, the read command processor 111 acquires the logical address of the read target data from the read command and generates an address resolution request including the acquired logical address. The address resolution request is a request for converting the logical address into a physical address of the NAND 190. The address converter 115 acquires the logical address (logical address of the read target data) included in the address resolution request. The address converter 115 determines whether a DRAM address corresponding to the acquired logical address is stored in the DRAM address table 154. Since the DRAM addresses are stored in the logical address order in the DRAM address table 154, the address converter 115 can perform the above determination using the logical address included in the address resolution request.

In a case where the address converter 115 determines that a DRAM address corresponding to the acquired logical address has been stored in the DRAM address table 154 (cache hit), the address converter 115 acquires the physical address in the address conversion table (cache) 151 by referring to the DRAM address. Thus, the address converter 115 can convert the logical address into the physical address without reference to the address conversion table 191 stored in the NAND 190. Since a time to access the DRAM 150 is shorter than a time to access the NAND 190, the storage device 100 can efficiently perform address conversion.

On the other hand, in a case where the address converter 115 determines that the DRAM address corresponding to the acquired logical address is not stored in the DRAM address table 154 (cache miss), the address converter 115 acquires the NAND address corresponding to the acquired logical address from the NAND address table 155. Since the NAND addresses are stored in the logical address order in the NAND address table 155, the address converter 115 can acquire the NAND address corresponding to the logical address by looking up the NAND address table 155 using the logical address as an index. The address converter 115 generates a table read request including the acquired NAND address. The table read request is a request for reading the address conversion table 191 in the NAND 190.

The NANDC 118 acquires the NAND address from the table read request generated by the address converter 115. The NANDC 118 accesses the acquired NAND address, and acquires the physical address from the address conversion table 191. The NANDC 118 outputs the acquired physical address to the address converter 115. Thus, the address converter 115 can convert the logical address into the physical address.

However, in this case, since it is necessary for the NANDC 118 to access the NAND 190, it takes a long time to perform address conversion. In this embodiment, even when the NANDC 118 accesses the NAND 190, performance degradation resulting from such access is mitigated by performing the multi-plane read to be described below. Hereinafter, a configuration for performing the multi-plane read in this embodiment will be described.

Figure 3:
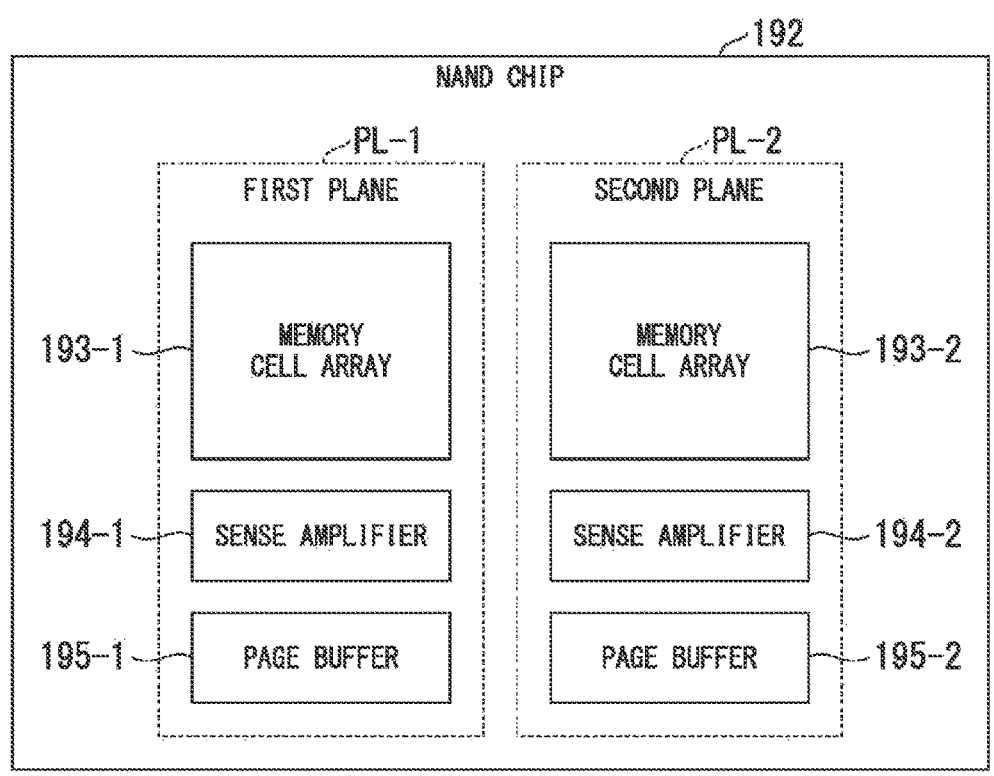
FIG. 3 is a diagram illustrating an example of the NAND chip of the first embodiment.

FIG. 3 is a diagram illustrating an example of a NAND chip of the first embodiment. The NAND 190 includes a plurality of the NAND chips 192. Each NAND chip 192 includes a first plane PL-1 (first region), and a second plane PL-2 (second region), but is not limited thereto. For example, the NAND chip 192 may include three or more planes. Each plane included in the NAND chip 192 has hardware that outputs data according to a read request.

The first plane PL-1 includes a memory cell array 193-1, a sense amplifier 194-1, and a page buffer 195-1, but is not limited thereto. In the memory cell array 193-1, a plurality of memory cells are arranged in a matrix form. The matrix form is a form in which a plurality of memory cells are arranged in direction of bit lines and word lines intersecting each other. The sense amplifier 194-1 reads the data in the memory cell array 193-1 on a page-by-page basis at the time of data reading. The sense amplifier 194-1 writes data to the memory cell array 193-1 on a page-by-page basis at the time of data writing. The page buffer 195-1 temporarily stores data to be written to the memory cell array 193-1 and data read from the memory cell array 193-1.

The second plane PL-2 includes a memory cell array 193-2, a sense amplifier 194-2, and a page buffer 195-2, but is not limited thereto. In the memory cell array 193-2, a plurality of memory cells are arranged in a matrix form. The sense amplifier 194-2 reads the data in the memory cell array 193-2 on a page-by-page basis at the time of data reading. The sense amplifier 194-2 writes data to the memory cell array 193-2 on a page-by-page basis at the time of data writing. The page buffer 195-2 temporarily stores data to be written to the memory cell array 193-2 and data read from the memory cell array 193-2.

Figure 4:
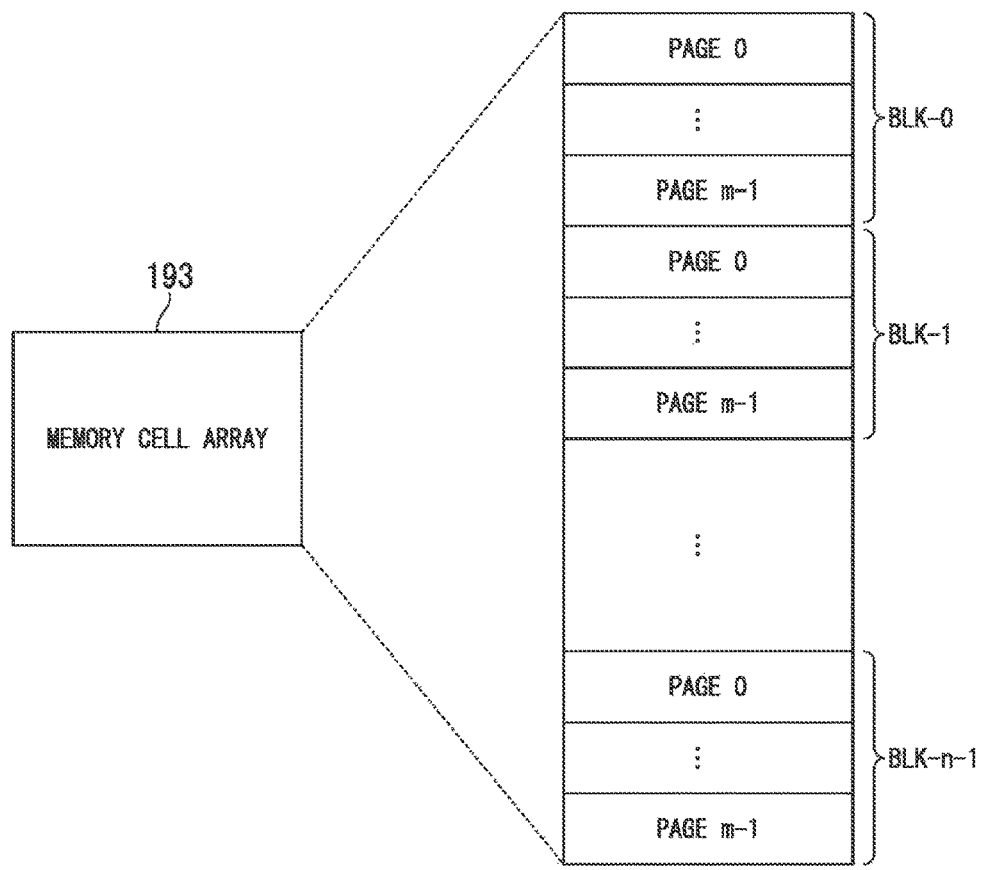
FIG. 4 is a diagram illustrating an example of blocks and pages in a memory cell array of the first embodiment.

FIG. 4 is a diagram illustrating an example of blocks and pages in the memory cell array in the first embodiment. Hereinafter, in a case where the particular plane to which the components belong is not being referenced, the components are simply referred to as a memory cell array 193, a sense amplifier 194, and a page buffer 195. As illustrated in FIG. 4, the memory cell array 193 includes a plurality of blocks BLK-0 to BLK-(n−1) (n is a natural number). Each of the plurality of blocks BLK-0 to BLK-(n−1) includes a plurality of pages 0 to m−1 (m is a natural number). The storage device 100 performs writing of data and reading of data on a page-by-page basis, and erases the data on a block-by-block basis.

Figure 5:
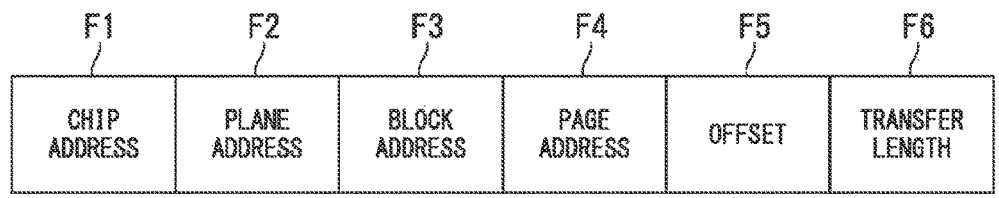
FIG. 5 is a diagram illustrating an example of fields included in a request generated by a first controller of the first embodiment.

FIG. 5 is a diagram illustrating an example of fields included in a request generated by the controller in the first embodiment. For example, the request generated by the controller 110 may be a table read request for reading a portion of the address conversion table 191 from the NAND 190, a user data read request for reading the user data 196 from the NAND 190, or a write request for writing data to the NAND 190, but is not limited thereto.

As illustrated in FIG. 5, each of the requests includes a first field F1 in which a chip address is described, a second field F2 in which a plane address is described, a third field F3 in which a block address is described, a fourth field F4 in which a page address is described, a fifth field F5 in which an offset is described, and a sixth field F6 in which a transfer length is described, but is not limited thereto. The chip address indicates an address of the NAND chip 192 in the NAND 190. The plane address indicates an address of the plane PL in the NAND chip 192. The block address indicates an address of the block BLK in the plane PL. The page address indicates an address of the page in the block BLK. The offset is a value indicating a position of data in the page. The transfer length indicates a size of data to be transferred.

The physical address of the NAND 190 is an address that is specified by the chip address, the plane address, the block address, the page address, and the offset. Therefore, the physical address of the NAND 190 is specified by the addresses described in the fields F1 to F4 and the offset described in the field F5.

Figure 6:
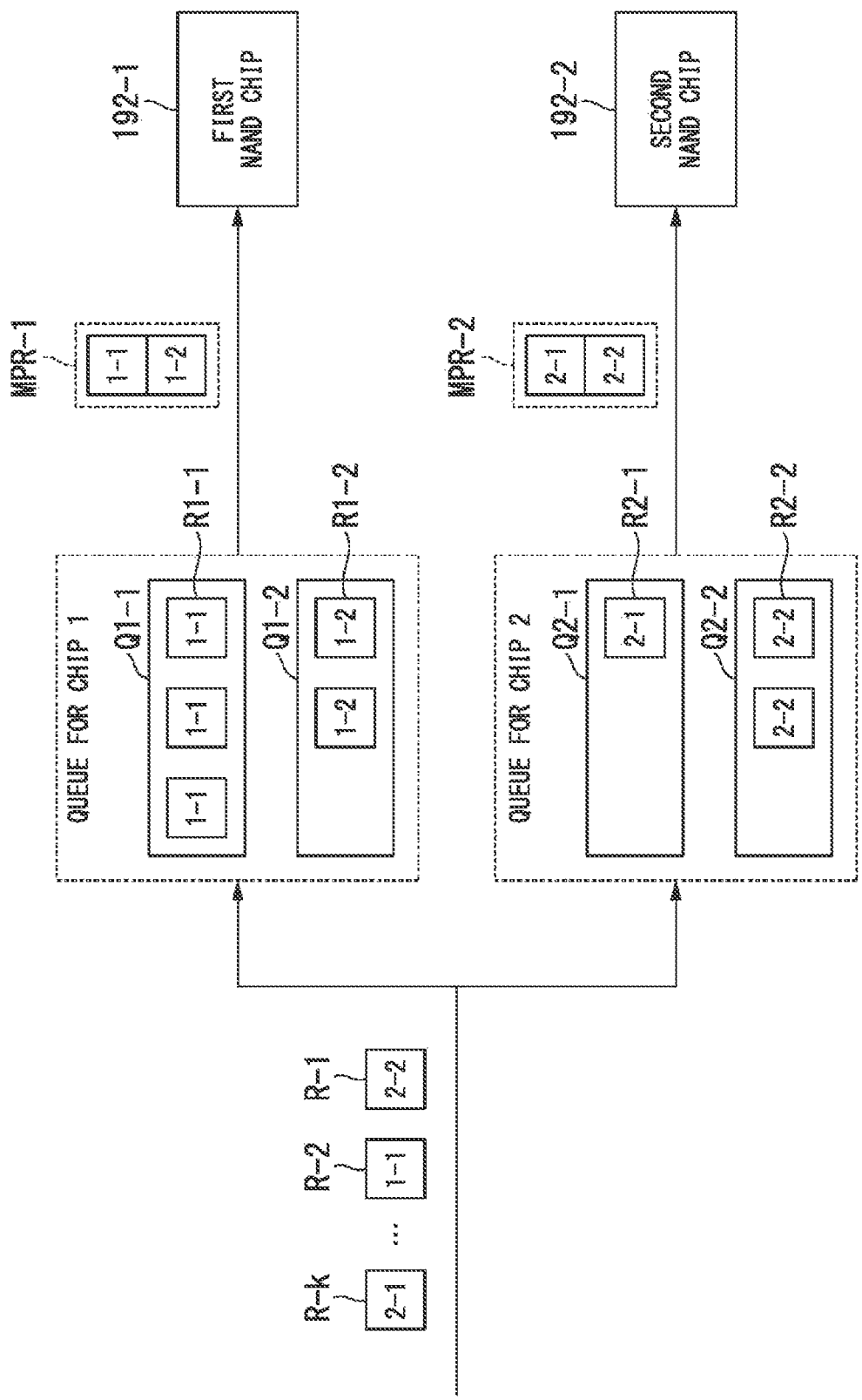
FIG. 6 is a diagram illustrating an example of forming a multi-plane read command in the first embodiment.

FIG. 6 is a diagram illustrating an example of forming the multi-plane read command in the first embodiment. For example, when an address resolution request or an address update request to be described below is input to the address converter 115, the address converter 115 generates a plurality of table read requests R-1 to R-k (k is a natural number). The table read request is a request for reading a portion of the address conversion table 191 from the NAND 190. The address converter 115 outputs the generated table read request to the classifier 116 (see FIG. 1).

The classifier 116 classifies a plurality of table read requests R-1 to R-k generated by the address converter 115 into a request for a first NAND chip 192-1 and a request for a second NAND chip 192-2. Although the two NAND chips 192-1 and 192-2 are illustrated in order to simplify the description in FIG. 6, three or more NAND chips may be provided in the NAND 190.

Hereinafter, it is assumed that 'a' in the table read request Ra-b denotes a value for specifying the chip, and 'b' denotes a value for specifying the plane. The classifier 116 classifies a plurality of table read requests for the first NAND chip 192-1 into a table read request R1-1 for reading the data from the first plane PL-1, and a table read request R1-2 for reading the data from the second plane PL-2. Similarly, the classifier 116 classifies a plurality of table read requests for the second NAND chip 192-2 into a table read request R2-1 for reading the data from the first plane PL-1, and a table read request R2-2 for reading the data from the second plane PL-2.

Hereinafter, 'a' in a queue Qa-b denotes a value for specifying the chip, and 'b' denotes a value for specifying the plane. The classifier 116 stores the table read request R1-1 in a queue Q1-1, stores the table read request R1-2 in a queue Q1-2, stores the table read request R2-1 in a queue Q2-1, and stores the table read request R2-2 in a queue Q2-2. Each of the queues Q1-1, Q1-2, Q2-1, and Q2-2 is a FIFO (First In, First Out) queue and is provided in the DRAM 150.

For example, as illustrated in FIG. 6, the table read request R-1 is a table read request for reading data from the second plane PL-2 of the second NAND chip 192-2, the table read request R-2 is a table read request for reading data from the first plane PL-1 of the first NAND chip 192-1, and the table read request R-k is a table read request for reading data from the first plane PL-1 of the second NAND chip 192-2. Therefore, the table read request R-1 is stored in the queue Q2-2, the table read request R-2 is stored in the queue Q1-1, and the table read request R-k is stored in the queue Q2-1.

The pairer 117 pairs the table read request R1-1 stored in the queue Q1-1 with the table read request R1-2 stored in the queue Q1-2 to generate a multi-plane read request MPR-1. For example, in a case where there are one or more table read requests in both of the queue Q1-1 and the queue Q1-2, the pairer 117 extracts and pairs first read requests in both of the queue Q1-1 and the queue Q1-2. On the other hand, in a case where there is no table read request in one of the queues, the pairer 117 outputs the single plane read request without pairing table read requests.

In another embodiment, in a case where there is a table read request in one of the queues and there is no table read request in the other queue, the pairer 117 may wait for the table read request for the other queue for a certain time. In a case where the table read request is stored in the other queue within the certain time, the pairer 117 pairs the table read requests to generate the multi-plane read request. In a case where the table read request is not stored in the other queue within the certain time, the pairer 117 outputs the single plane read request as it is without pairing table read requests. The certain time may be determined by a trade-off between latency and throughput.

The pairer 117 outputs the generated multi-plane read request MPR-1 to the NANDC 118. The NANDC 118 outputs the multi-plane read request MPR-1 received from the pairer 117 to the first NAND chip 192-1. The page address of the first plane PL-1 and the page address of the second plane PL-2 included in the multi-plane read request MPR-1 may be different.

When the multi-plane read request MPR-1 is input to the first NAND chip 192-1, the first NAND chip 192-1 reads data corresponding to one page from the memory cell array 193-1 of the first NAND chip 192-1 based on the NAND address included in the paired table read request R1-1, and reads data corresponding to one page from the memory cell array 193-2 of the first NAND chip 192-1 based on the NAND address included in the paired table read request R1-2 in parallel. The first NAND chip 192-1 outputs the read data to the NANDC 118. The NANDC 118 outputs the data received from the first NAND chip 192-1 to the address converter 115.

Similarly, the pairer 117 pairs the table read request R2-1 stored in the queue Q2-1 with the table read request R2-2 stored in the queue Q2-2 to generate a multi-plane read request MPR-2. The pairer 117 outputs the generated multi-plane read request MPR-2 to the NANDC 118. The NANDC 118 outputs the multi-plane read request MPR-2 received from the pairer 117 to the second NAND chip 192-2. The page address of the first plane PL-1 and the page address of the second plane PL-2 included in the multi-plane read request MPR-2 may be different.

When the multi-plane read request MPR-2 is input to the second NAND chip 192-2, the second NAND chip 192-2 reads data corresponding to one page from the memory cell array 193-1 of the second NAND chip 192-2 based on the NAND address included in the paired table read request R2-1, and reads data corresponding to one page from the memory cell array 193-2 of the second NAND chip 192-2 based on the NAND address included in the paired table read request R2-2. The second NAND chip 192-2 outputs the read data to the NANDC 118. The NANDC 118 outputs the data received from the second NAND chip 192-2 to the address converter 115.

Thus, the NANDC 118 outputs the multi-plane read request generated by the pairer 117 to the NAND 190. By performing the multi-plane read that pairs a plurality of read requests, the NAND 190 can read data in parallel from a plurality of planes. Therefore, it is possible to improve throughput compared to the read request with the single-plane reads that are transmitted to the NAND 190 one by one.

Figure 7:
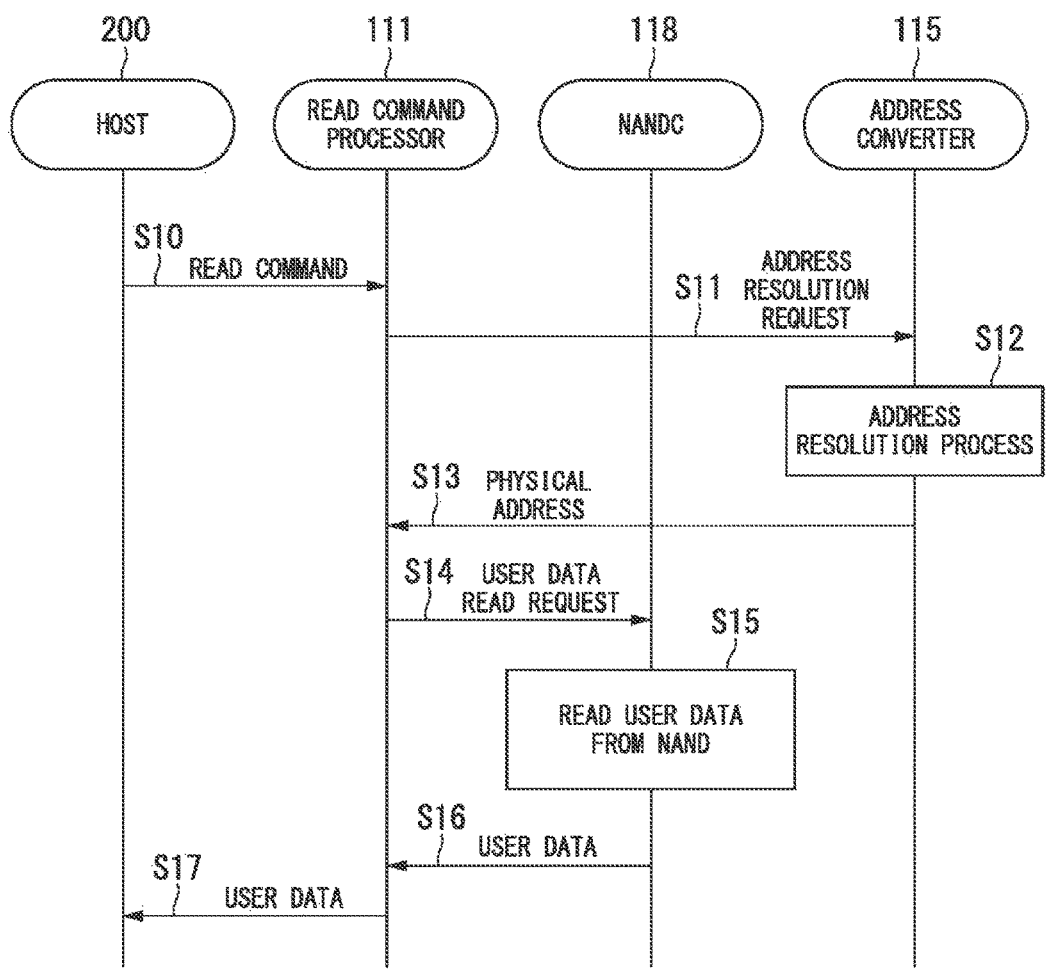
FIG. 7 is a sequence diagram illustrating an example of a process of reading user data in the first embodiment.

FIG. 7 is a sequence diagram illustrating an example of a process of reading user data in the first embodiment. Hereinafter, a process of reading the user data 196 from the NAND 190 will be described.

The host 200 transmits a read command to the storage device 100. The host I/F 130 of the storage device 100 outputs the read command received from the host 200 to the read command processor 111 (S10).

The read command processor 111 acquires a logical address of the read target data in the read command received from the host I/F 130. The read command processor 111 generates an address resolution request including the acquired logical address. The read command processor 111 outputs the generated address resolution request to the address converter 115 (S11).

The address converter 115 performs an address resolution process to be described below based on the address resolution request received from the read command processor 111 (S12). The address resolution process is a process for converting the logical address into the physical address of the NAND 190. The address converter 115 outputs the physical address obtained by performing the address resolution process to the read command processor 111 (S13).

The read command processor 111 generates a user data read request including the physical address received from the address converter 115. The read command processor 111 outputs the generated user data read request to the NANDC 118 (S14).

The NANDC 118 reads the user data 196 from the NAND 190 based on the user data read request received from the read command processor 111 (S15). For example, the NANDC 118 acquires the physical address of the NAND 190 included in the user data read request, and accesses the acquired physical address to read the user data 196 from the NAND 190.

The NANDC 118 outputs the user data 196 read from the NAND 190 to the read command processor 111 (S16). Then, the read command processor 111 stores the user data 196 received from the NANDC 118 in the read buffer 153 of the DRAM 150. The controller 110 reads the user data 196 from the read buffer 153, and transmits the read user data 196 to the host 200 via the host I/F 130 (S17).

Figure 8:
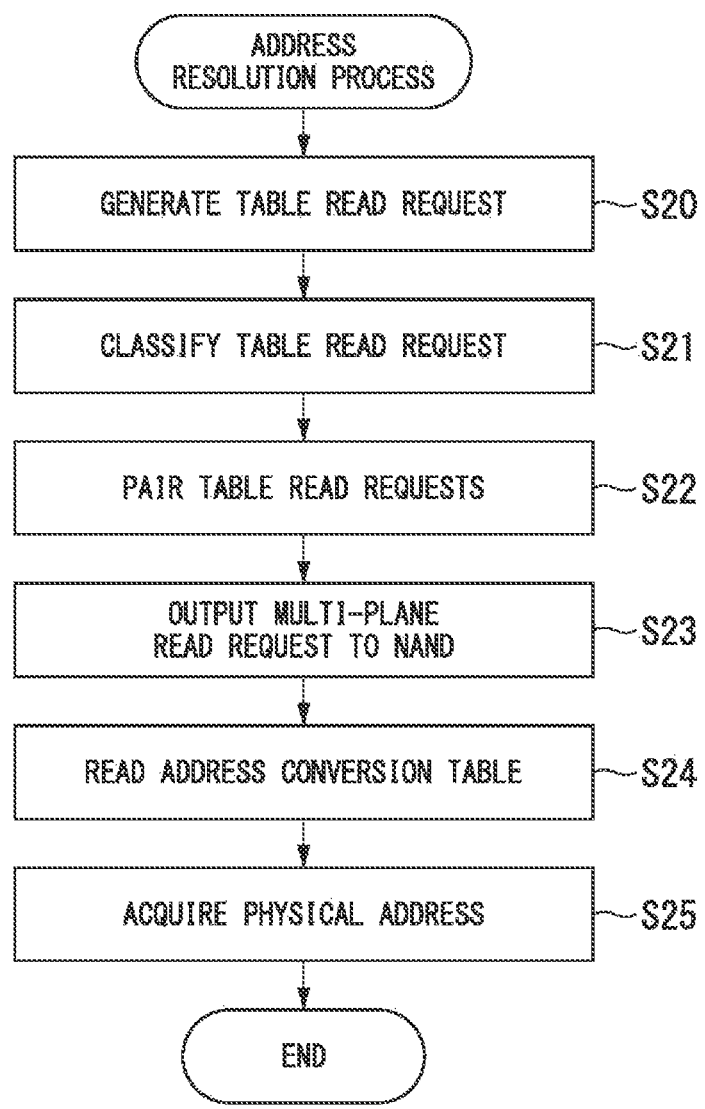
FIG. 8 is a flowchart illustrating an example of an address resolution process in the first embodiment.

FIG. 8 is a flowchart illustrating an example of the address resolution process in the first embodiment. When the address resolution request is input to the address converter 115, the address converter 115 acquires the logical address included in the address resolution request and determines whether a sub-table of the address conversion table (cache) 151 corresponding to the logical address included in the address resolution request is stored in the DRAM 150. In a case where the address converter 115 determines that the sub-table is not stored in the DRAM 150 (i.e., in the case of a cache miss), the address converter 115 generates a table read request for the sub-table (S20) and subsequently executes steps S21-S25. On the other hand, in a case where the address converter 115 determines that the sub-table is stored in the DRAM 150 (i.e., in the case of a cache hit), the address converter 115 simply skips steps S21-S24 and acquires the corresponding physical address (S25) by looking up the sub-table.

The following description is a description about the cache miss case, where the address converter 115 generates a table read request for reading the sub-table corresponding to the acquired logical address (S20). The table read request is a request for reading the address conversion table 191 from the NAND 190. The address converter 115 looks up the NAND address table 155 with an index of the logical address and obtains a physical address where the sub-table corresponding the logical address is stored in the NAND 190. The address converter 115 generates a table read request including the obtained physical address of the sub-table.

The classifier 116 classifies for each NAND chip, the table read request generated by the address converter 115 into a first table read request for reading data from the first plane PL-1, and a second table read request for reading data from the second plane PL-2 (S21).

The pairer 117 pairs the first table read request and the second table read request classified by the classifier 116 with each other to generate a multi-plane read request (S22). The pairer 117 outputs the generated multi-plane read request to the NANDC 118.

In a case where there is only one of the first table read request and the second table read request, the pairer 117 may output one of the first read request and the second read request to the NANDC 118 without performing the pairing to read the data from the NAND 190. Thus, it is not necessary for the pairer 117 to wait until both of the first table read request and the second table read request are obtained. Accordingly, it is possible to improve throughput.

The NANDC 118 outputs the multi-plane read request received from the pairer 117 to the NAND 190 (S23). When the multi-plane read request is input to the NAND chip 192, the NAND chip 192 reads the address conversion table corresponding to the logical address of the address resolution target from the memory cell array 193 (S24).

As explained above, by performing the multi-plane read that pairs a plurality of table read requests, it is possible to read the data in parallel from a plurality of planes and to improve throughput.

The NANDC 118 outputs the address conversion table read from the memory cell array 193 to the address converter 115.

Accordingly, in the cache miss case, the address converter 115 acquires a physical address corresponding to the logical address of the address resolution target from the address conversion table received from the NANDC 118 (S25). On the other hand, in the cache hit case, the address converter 115 looks up the DRAM address table 154 with the logical address as an index and acquires a location in the DRAM at which the address conversion table (cache) 151 is stored, and then looks up the address conversion table (cache) 151 with the logical address as an index to acquire the corresponding physical address.

As explained above, the address converter 115 determines whether the sub-table corresponding to the logical address included in the address resolution request is included in the address conversion table (cache) 151 stored in the DRAM 150. In a case where the sub-table corresponding to the logical address included in the address resolution request is included in the address conversion table (cache) 151 stored in the DRAM 150 (cache hit), the address converter 115 converts the logical address into a physical address using the address conversion table (cache) 151 stored in the DRAM 150. On the other hand, in a case where the sub-table corresponding to the logical address included in the address resolution request is not included in the address conversion table (cache) 151 stored in the DRAM 150 (cache miss), the address converter 115 converts the logical address into the physical address using the address conversion table 191 stored in the NAND 190.

The address converter 115 stores a portion of the address conversion table read from the NAND 190 in the DRAM 150 as the address conversion table (cache) 151, and updates the DRAM address table 154 (see FIG. 2). Thus, the address converter 115 can acquire the physical address by referring to the address conversion table (cache) 151 in the DRAM 150 without accessing the NAND 190 from the next time.

In the address resolution process, since the multi-plane read in which a plurality of table read requests are paired is performed, it is possible to improve throughput.

Figure 9:
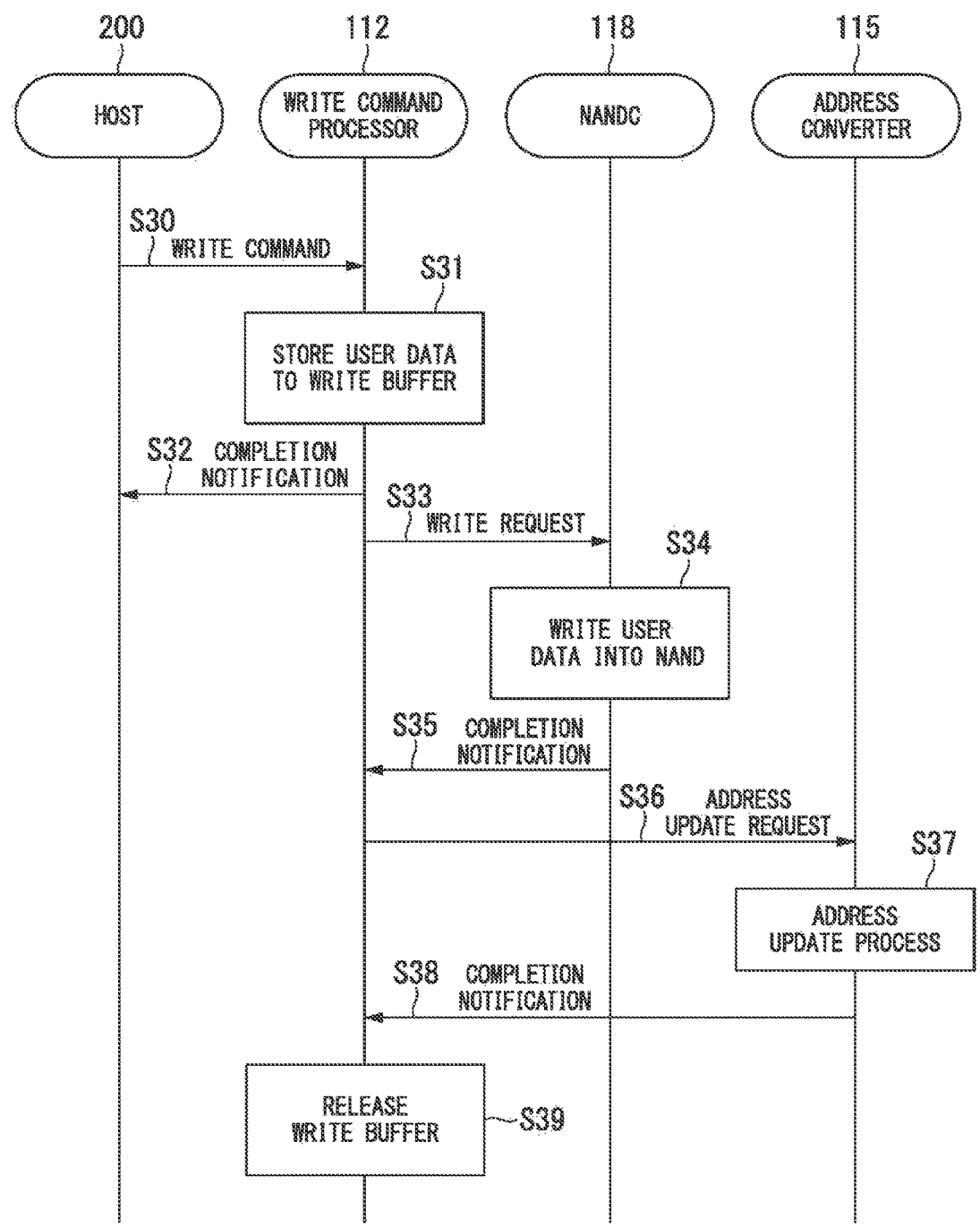
FIG. 9 is a sequence diagram illustrating an example of a write-back process for user data in the first embodiment.

FIG. 9 is a sequence diagram illustrating an example of a write-back process for user data in the first embodiment. The write-back process is a process of temporarily storing, in the write buffer 152, the data instructed to be written to the NAND 190 by the write command, transmitting a completion response to the host, at any timing, and then writing the data in the write buffer 152 to the NAND 190. The timing at which the completion response is transmitted to the host is asynchronous with respect to writing data into the NAND 190. Hereinafter, a write-back processing for the user data will be described.

The host 200 transmits a write command and user data to the storage device 100. The host I/F 130 of the storage device 100 outputs the write command and the user data received from the host 200 to the write command processor 112 (S30).

In the write command, information indicating a start logical block address (LBA) of the data and a data length is included. The write command processor 112 writes the user data corresponding to the write command to the write buffer 152 in the DRAM 150 (S31). Thereafter, the write command processor 112 transmits a completion notification indicating the completion of writing to the host 200 via the host I/F 130 (S32).

The write command processor 112 allocates a physical address of write destination in the NAND 190, and then generates a write request for writing the user data in the write buffer 152 with the allocated physical address. The generation of the write request to the NAND 190 is asynchronous with respect to receiving the write command from the host and with respect to sending the completion notification to the host. The write request also includes the logical address of the user data. The write command processor 112 outputs the generated write request to the NANDC 118 (S33).

The NANDC 118 stores the user data 196 in the NAND 190 based on the write request received from the write command processor 112 (S34). Then, the NANDC 118 outputs a completion notification indicating that writing of the user data 196 has been completed, to the write command processor 112 (S35).

When the user data 196 is written in the NAND 190, it is necessary to update the address conversion table 191. Therefore, when the write command processor 112 receives the completion notification from the NANDC 118, the write command processor 112 generates an address update request including the logical address and the physical address at which the user data is stored in NAND 190. The write command processor 112 outputs the generated address update request to the address converter 115 (S36).

The address converter 115 performs an address update process to be described below based on the address update request received from the write command processor 112 (S37). The address update process is a process of updating the address conversion table 191 stored in the NAND 190.

When the address converter 115 completes the address update process, the address converter 115 outputs a completion notification indicating that the address update process is completed to the write command processor 112 (S38). The write command processor 112 releases the write buffer 152 based on the completion notification received from the address converter 115 (S39).

As explained above, when the write command processor 112 does not write the user data in the NAND 190 even after the write command processor 112 has stored the user data in the write buffer 152 of the DRAM 150, the write command processor 112 does not generate an address update request. This is because it is not necessary to update the address conversion table 191 when the user data has not yet been written in the NAND 190.

The write command processor 112 transmits a completion notification to the host 200 when the user data is stored in the write buffer 152 instead of when the user data is written to the NAND 190. The write-back process is executed to speed up apparent processing completion.

Therefore, according to the write-back process illustrated in FIG. 9, it is possible to increase the number of write commands that the host 200 can transmit per unit time. Further, according to the write-back process, the total number of table reads is not limited by a queue depth (QD) of the write commands. The QD of the write commands is a total number (upper limit) of write commands that can be transmitted at a time from the host 200 to the storage device 100, in other words, to be processed or being processed (in flight). By increasing the number of the table reads to be queued in the processing within the storage device 100 of the write-back processing, the pairer 117 can improve a probability of the table read requests to be paired.

Figure 10:
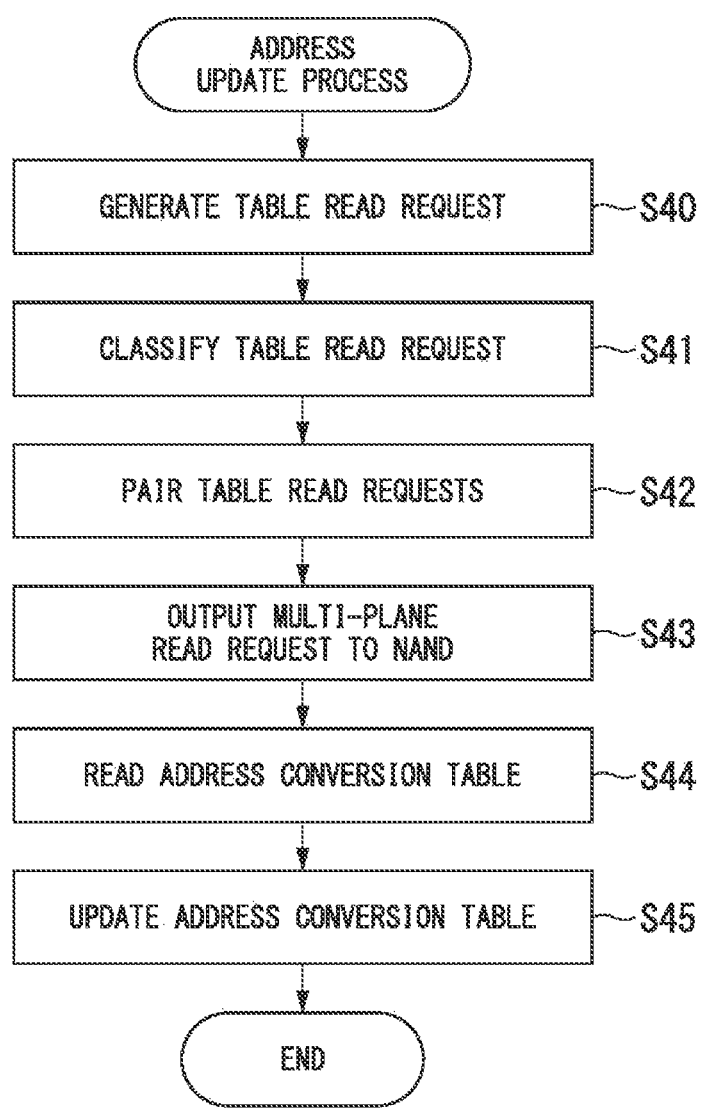
FIG. 10 is a flowchart illustrating an example of an address update process in the first embodiment.

FIG. 10 is a flowchart illustrating an example of an address update process in the first embodiment. When the address update request is input to the address converter 115 (wherein the logical address and the physical address, which points to the NAND 190 at which the user data has been written, are included in the address update request), the address converter 115 acquires the logical address included in the address update request. The address converter 115 determines whether a sub-table of the address conversion table (cache) 151 corresponding to the logical address is stored in the DRAM 150 (cache hit) or not (cache miss), by looking up the DRAM address table 152 with the logical address as an index. In the cache hit case, the address converter 115 skips steps S40-S44 and proceeds to the step S45. On the other hand, in the cache miss case, the address converter 115 generates the table read request for reading the sub-table including the acquired logical address (S40).

The classifier 116 classifies the table read request generated by the address converter 115 into a first table read request for reading data from the first plane PL-1 and a second table read request for reading the data from the second plane PL-2 (S41).

The pairer 117 pairs the first table read request and the second table read request classified by the classifier 116 to generate a multi-plane read request (S42). The pairer 117 outputs the generated multi-plane read request to the NANDC 118.

In a case where only one of the first table read request and the second table read request exists, the pairer 117 may further generate a single-plane read request without performing the pairing, and output the single-plane read request to the NANDC 118. Thus, since it is not necessary for the pairer 117 to wait until both of the first table read request and the second table read request are obtained, it is possible to improve throughput.

The NANDC 118 outputs the multi-plane read request received from the pairer 117 to the NAND 190 (S43). When the multi-plane read request is input to the NAND chip 192, the NAND chip 192 reads the sub-tables including the logical addresses that are targets of the address update, from the memory cell array 193 (S44).

As explained above, by performing the multi-plane read that pairs a plurality of table read requests, it is possible to read the data in parallel from a plurality of planes, and to improve throughput.

The NANDC 118 outputs the sub-table read from the memory cell array 193 to the address converter 115 in the cache miss case (this step is omitted in the cache hit case). Then, the address converter 115 updates the sub-table corresponding to the logical address with the physical address in response to the address update request, wherein the logical address and the physical address are included in the address update request. The physical address here points to the NAND 190 at which the user data has been written.

The address converter 115 stores the updated sub-table in the DRAM 150 as part of the address conversion table (cache) 151, and updates the DRAM address table 154 (see FIG. 2). Thus, next time, the address converter 115 can acquire the physical address by referring to the address conversion table (cache) 151 in the DRAM 150 without accessing the NAND 190. The NANDC 118 writes the address conversion table (cache) 151 in the DRAM 150 into the NAND 190 at any timing, and then, the address converter 115 updates an entry of the NAND address table 155 corresponding to the sub-table (the address conversion table (cache) 151 written into the NAND 190) with the physical address at which the sub-table has been written (S45).

As explained above, the write command processor 112 temporarily stores the user data in the write buffer 152 of the DRAM 150 based on the write command received from the host 200, and notifies the host 200 of the completion of the write command. The NANDC 118 writes the user data stored in the write buffer 152 of the DRAM 150 into the NAND 190. The write command processor 112 generates an address update request for updating the correspondence relationship between the logical address and the physical address for the user data. The address converter 115 generates a first read request and a second read request based on one or more address update requests. The pairer 117 pairs the first read request with the second read request to generate a multi-plane read request. The NANDC 118 outputs the multi-plane read request to the NAND 190, and reads the address conversion table from the NAND 190. The address converter 115 updates the address conversion table read from the NAND 190.

In the address updating process, since the multi-plane read that pairs a plurality of table read requests is performed, it is possible to improve throughput. Therefore, the write command processor 112 can complete the write-back processing of the user data in a short time.

Here an example of a garbage collection process in the first embodiment is described. The garbage collection process includes a valid data determination process and a cluster migration process. The valid data determination process is a process for identifying valid data included in a garbage collection target block. The cluster migration process includes 1) a cluster copying process for copying the identified valid data into a copy destination block and 2) an address update process for updating the address conversion table.

Figure 11:
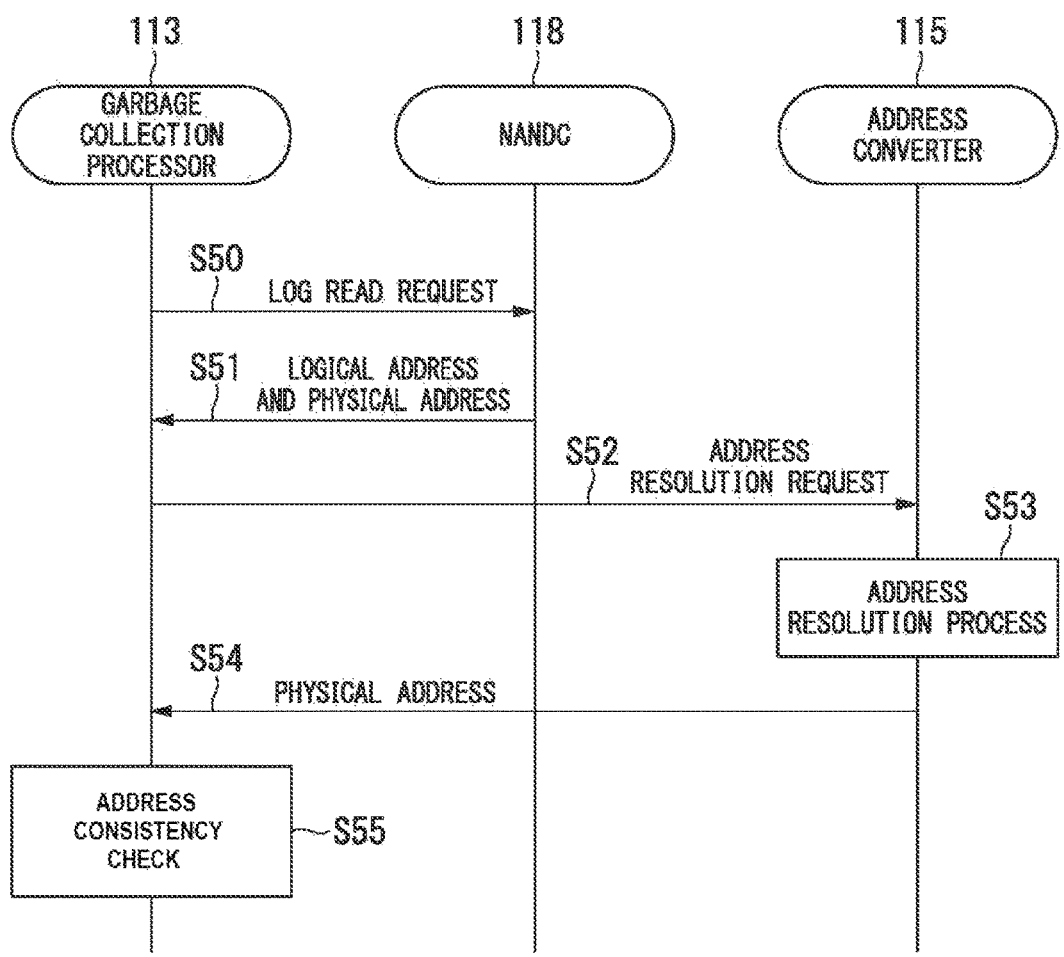
FIG. 11 is a sequence diagram illustrating an example of a valid data determination process in the first embodiment.

FIG. 11 is a sequence diagram illustrating an example of a valid data determination process in the first embodiment. The valid data determination process is a process of determining whether or not the data in the blocks of the NAND 190 is valid. The data stored in the physical address referenced by the address conversion table is valid, and other data is invalid. The data determined to be valid is processed in the cluster copying process that will be described below. The cluster copying process is a process of copying the determined valid data in a first block (i.e., a garbage collection target block) to a second block (i.e., a copy destination block) and updating the address conversion table to invalidate all items of data in the first block. After all data of the first block is invalidated, all data in the first block is erased. Hereinafter, the valid data determination process will be described.

The garbage collection processor 113 outputs a log read request to the NANDC 118 (S50). The log read request is a request for acquiring at least a logical address and a physical address of all of items of the data stored in the first block (garbage collection target block) of the NAND 190.

The NANDC 118 reads a log regarding the first block from the NAND 190 based on a log read request received from the garbage collection processor 113. The log is written to the NAND 190 at the time of writing of the data based on the request from the host 200, into the NAND 190, or at the time of writing of data by the garbage collection. The correspondence relationship between the logical address and the physical address corresponding to the data (cluster) stored in the first block is described in the log. The NANDC 118 acquires the logical address and the physical address of the data stored in the first block by referring to the read log. The NANDC 118 outputs the acquired logical address and the acquired physical address to the garbage collection processor 113 (S51).

The garbage collection processor 113 generates an address resolution request including the logical address received from the NANDC 118. The garbage collection processor 113 then outputs the generated address resolution request to the address converter 115 (S52).

The address converter 115 performs the address resolution process described above based on the address resolution request generated by the garbage collection processor 113 (S53). The address converter 115 outputs the physical address obtained by performing the address resolution process to the garbage collection processor 113 (S54).

The garbage collection processor 113 performs an address consistency check process, which determines whether data is valid or not using the physical address received from the address converter 115 in step S54 and the physical address received from the NANDC 118 in step S51 (S55). For example, for data with a certain logical address, in a case where the physical address received from the address converter 115 in step S54 and the physical address received from the NANDC 118 in step S51 match, the garbage collection processor 113 determines that the data stored in the physical address is valid. On the other hand, in a case where the physical address received from the address converter 115 in step S54 and the physical address received from the NANDC 118 in step S51 do not match, the garbage collection processor 113 determines that the data stored in the physical address received from the NANDC 118 in step S51 is invalid.

As explained above, the garbage collection processor 113 generates an address resolution request for converting the logical address of the data stored in the first block of the NAND 190 into a corresponding physical address. The address converter 115 converts the logical address of the data stored in the first block into the first physical address based on the address resolution request. The garbage collection processor 113 determines whether or not the data stored in the first block is valid based on the first physical address converted from the logical address and a second physical address indicating the physical address of the data stored in the first block.

In the address resolution process of step S53, since the multi-plane read that pairs a plurality of table read requests is performed, it is possible to improve throughput. Therefore, the garbage collection processor 113 can complete the valid data determination process in a short time.

Figure 12:
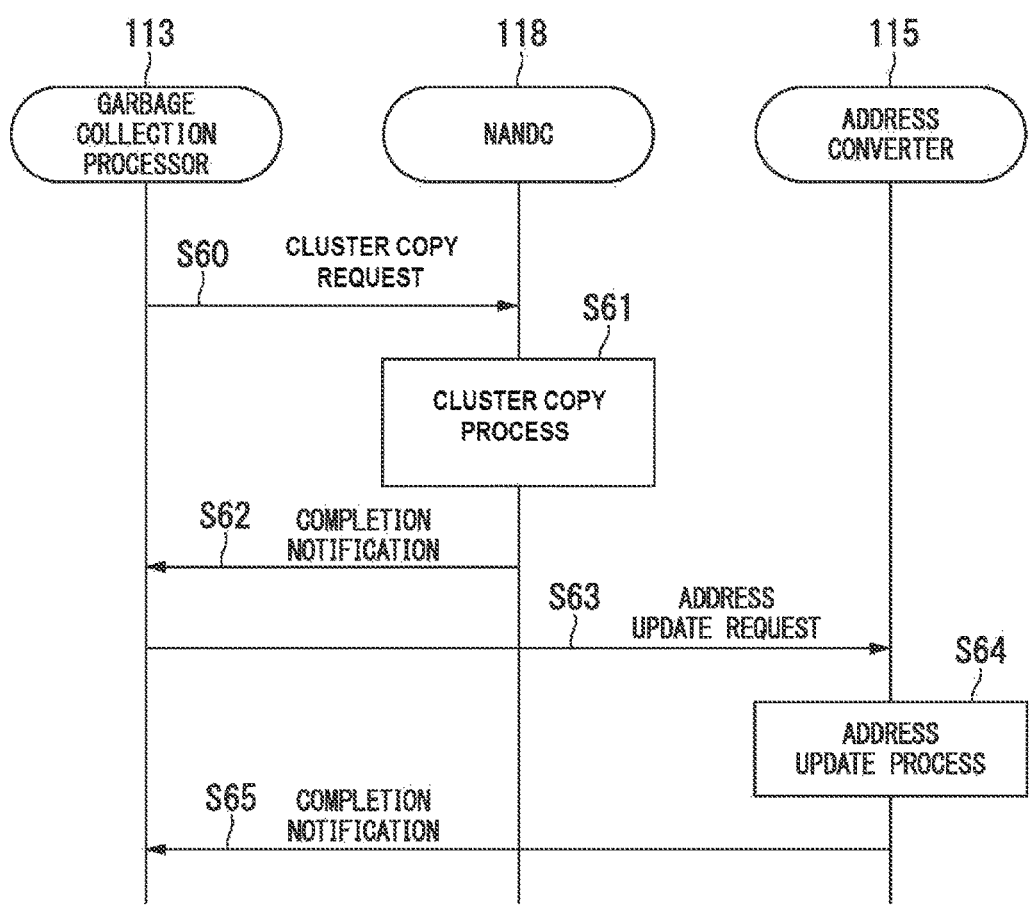
FIG. 12 is a sequence diagram illustrating an example of a cluster migration process in the first embodiment.

FIG. 12 is a sequence diagram illustrating an example of the cluster migration process in the first embodiment. The cluster migration process illustrated in FIG. 12 is performed subsequently to the valid data determination process illustrated in FIG. 11. Hereinafter, the cluster migration process will be described.

The garbage collection processor 113 outputs a cluster copying request to the NANDC 118 (S60). The cluster copying request is a request for copying determined valid data in the first block (the garbage collection target block) of the NAND 190 into the second block (the copy destination block). The cluster copying request includes a logical address and a physical address of the valid data in the first block, where the valid data is data determined to be valid in the valid data determination process described above (FIG. 11).

The NANDC 118 executes the cluster copying process based on the cluster copying request received from the garbage collection processor 113 (S61). For example, the NANDC 118 copies the valid data in the first block to the second block. After updating the address conversion table (described below) to invalidate all data in the first block, it is possible to use the first block as a free block, and then as an erased block after erasing. When the NANDC 118 completes the cluster copying process, the NANDC 118 notifies the garbage collection processor 113 with a completion notification indicating that the cluster copying process is completed (S62).

Since the valid data has been copied when the cluster copying process is completed, it is necessary to update the address conversion table 191. Therefore, the garbage collection processor 113 generates an address update request including the logical address and the physical address in the second block into which the valid data has been copied. The garbage collection processor 113 outputs the generated address update request to the address converter 115 (S63).

The address converter 115 performs an address update process described above based on the address update request received from the garbage collection processor 113 (S64). When the address converter 115 completes the address update process, the address converter 115 outputs a completion notification indicating that the address update process is completed to the garbage collection processor 113 (S65).

As explained above, the garbage collection processor 113 copies the valid data in the first block of the NAND 190 to the second block and updates the address conversion table to invalidate the data of the first block. The garbage collection processor 113 generates an address update request for updating a correspondence relationship between the logical address and the physical address in the second block into which the valid data copied. The address converter 115 determines whether the sub-table corresponding to the logical address is stored in the DRAM 150 (cache hit) or not (cache miss).

In the cache hit case, the address converter 115 updates an entry, corresponding to the logical address, to the physical address in the second block, of the sub-table in the address conversion table (cache) in the DRAM 150.

On the other hand, in the cache miss case, the address converter 115 generates the first read request and the second read request based on one or more address update requests. The pairer 117 pairs the first read request and the second read request to generate the multi-plane read request. The NANDC 118 outputs the multi-plane read request to the NAND 190, and reads the address conversion table from the NAND 190. The address converter 115 updates an entry, corresponding to the logical address, to the physical address in the second block, of the sub-table in the address conversion table read from the NAND 190.

In the address updating process of step S64, since the multi-plane read that pairs a plurality of table read requests is performed, it is possible to improve throughput. Therefore, the garbage collection processor 113 can improve the throughput of the garbage collection process.

Here, two kinds of UNMAP processing are explained. An UNMAP command (or a TRIM command) is a command for instructing a logical address associated with which data to be invalidated.

Figure 13:
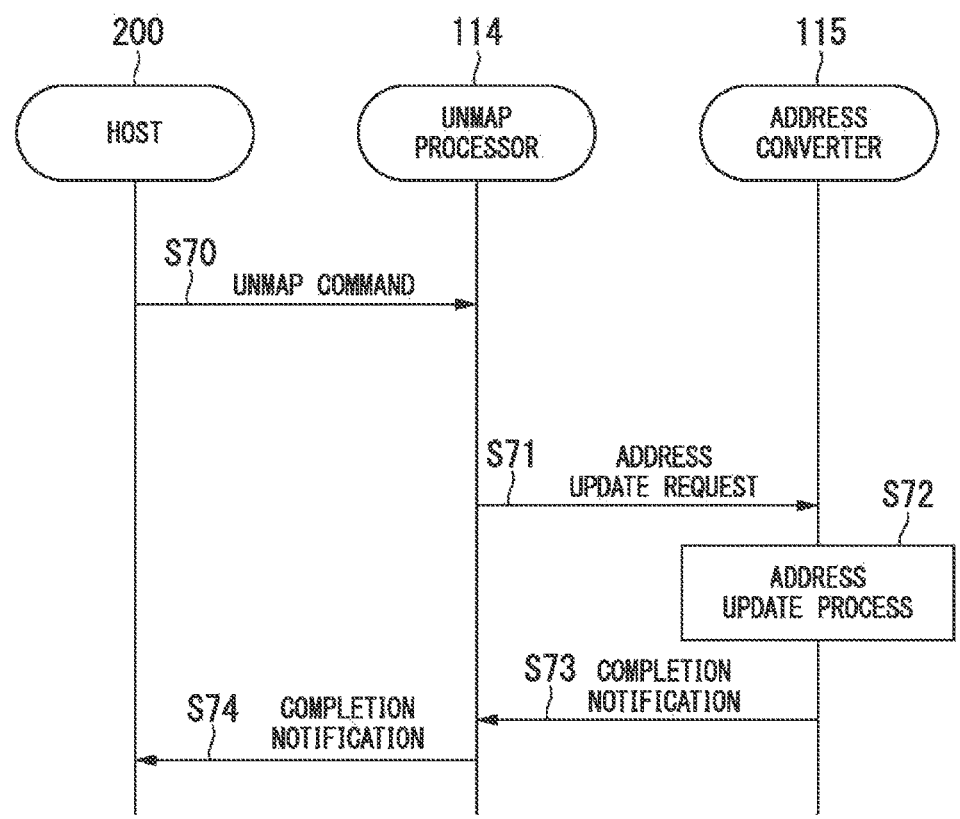
FIG. 13 is a sequence diagram illustrating an example of foreground UNMAP processing in the first embodiment.

FIG. 13 is a sequence diagram illustrating an example of foreground UNMAP processing in the first embodiment. The foreground UNMAP processing is a process for dissolving the correspondence relationship between the logical address and the existing physical address in the address conversion table 191 in a foreground. As used herein, "in the foreground" means that a completion notification is sent to the host after the dissolving process has been done in the address conversion table. Hereinafter, the foreground UNMAP processing will be described.

The host 200 transmits an UNMAP command to the storage device 100. The UNMAP command triggers the UNMAP processing. The UNMAP processing is a process of invalidating data associated with the logical address. Specifically, in the address conversion table, an UNMAPPED state is associated with the logical address. The UNMAP command includes the logical address to be processed in the UNMAP process. The host I/F 130 of the storage device 100 outputs the UNMAP command received from the host 200 to the UNMAP processor 114 (S70).

The UNMAP processor 114 acquires the logical address from the UNMAP command received from the host I/F 130. The UNMAP processor 114 generates an address update request including the acquired logical address and information indicating that the UNMAP processing is to be performed (for example, a particular, reserved number indicating the UNMAPPED state). The UNMAP processor 114 outputs the generated address update request to the address converter 115 (S71).

The address converter 115 performs an address update process described above based on the address update request received from the UNMAP processor 114 (S72). In this case, the address converter 115 updates the address conversion table 191 so as to dissolve the correspondence relationship between the logical address included in the address update request and the existing physical address of the NAND 190. For example, the address converter 115 updates the physical address of the address conversion table (cache) 151 with the reserved number indicating the UNMAPPED state, and updates the address conversion table 191 in the NAND 190 based on the updated address conversion table (cache) 151.

When the address converter 115 completes the address update process, the address converter 115 outputs a completion notification indicating that the address update process is completed to the UNMAP processor 114 (S73). The UNMAP processor 114 transmits a completion notification indicating that the UNMAP processing is completed, to the host 200 via the host I/F 130 based on the completion notification received from the address converter 115 (S74).

As explained above, the UNMAP processor 114 generates an address update request to dissolve the correspondence relationship between the logical address included in the UNMAP command and the existing physical address based on the UNMAP command received from the host 200. The address converter 115 generates the first read request and the second read request based on one or more address update requests. The pairer 117 pairs the first read request with the second read request to generate the multi-plane read request. The NANDC 118 outputs the multi-plane read request to the NAND 190 and reads the address conversion table from the NAND 190. The address converter 115 updates the read address conversion table based on the updated address conversion table (cache) 151. Specifically, the address converter 115 updates the physical address of the address conversion table (cache) 151 with the reserved number.

In the address updating process of step S72, since the multi-plane read that pairs a plurality of table read requests is performed, it is possible to improve throughput. Therefore, the UNMAP processor 114 can improve the throughput of the foreground UNMAP process.

Figure 14:
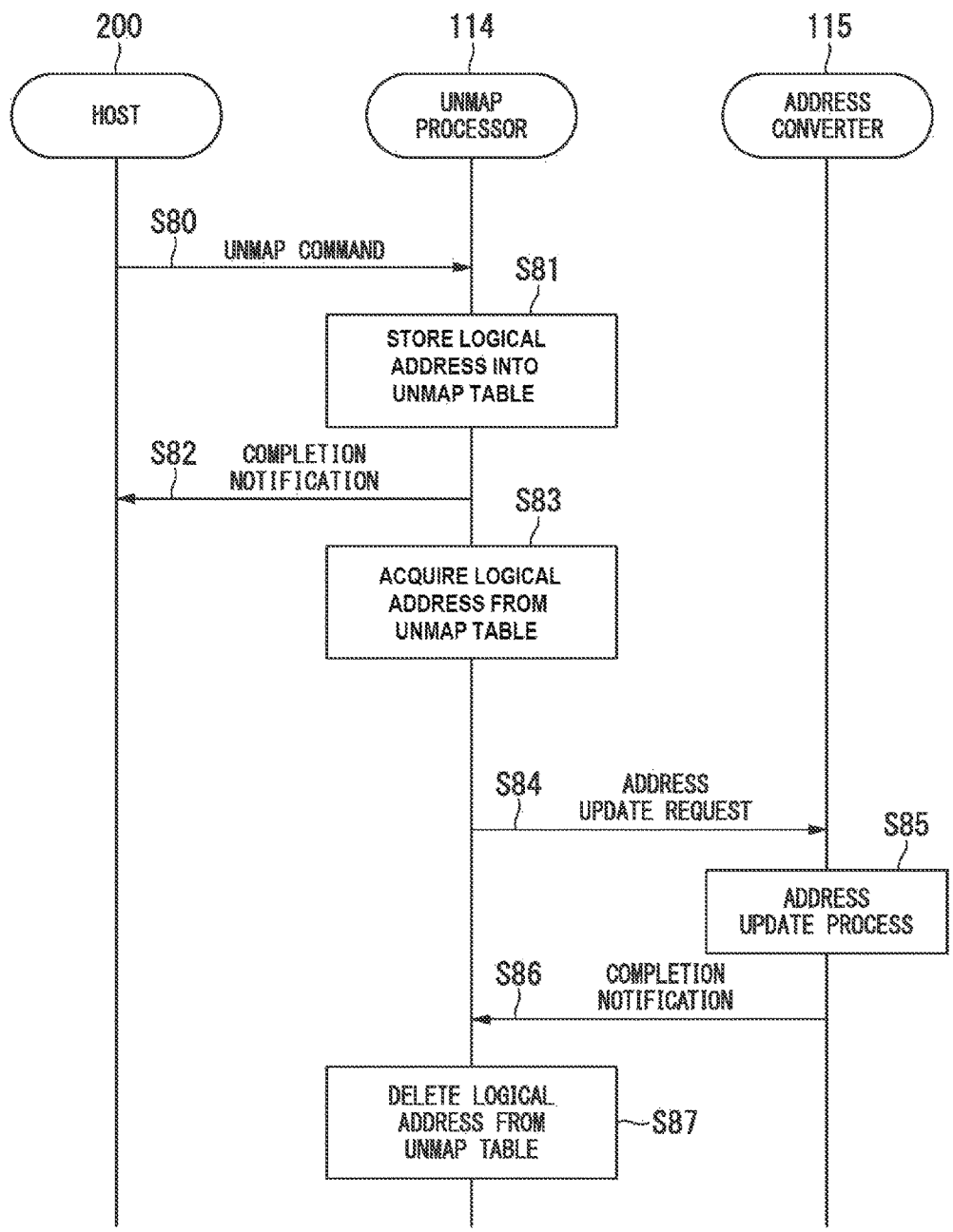
FIG. 14 is a sequence diagram illustrating an example of a background UNMAP processing in the first embodiment.

FIG. 14 is a sequence diagram illustrating an example of a background UNMAP processing in the first embodiment. The background UNMAP processing is a process for dissolving a correspondence relationship between the logical address and the existing physical address in the address conversion table 191 in the background. As used herein "in the background" means that the completion notification is sent to the host before (i.e., asynchronously to the completion of) the dissolving process is actually performed in the address conversion table. Hereinafter, the background UNMAP processing will be described.

The host 200 transmits an UNMAP command, which is described above, to the storage device 100. The host I/F 130 of the storage device 100 outputs the UNMAP command received from the host 200 to the UNMAP processor 114 (S80).

The UNMAP processor 114 acquires the logical address from the UNMAP command received from the host I/F 130. The UNMAP processor 114 stores the acquired logical address into an UNMAP table (S81). The UNMAP table is stored in the DRAM 150. Thereafter, the UNMAP processor 114 transmits a completion notification indicating that the UNMAP processing is completed to the host 200 via the host I/F 130 (S82).

Then, the UNMAP processor 114 acquires the logical address from the UNMAP table at any timing (S83). The UNMAP processor 114 generates an address update request including the acquired logical address and information indicating that an UNMAP processing is to be performed (for example, a particular, reserved number indicating an UNMAPPED state). The UNMAP processor 114 outputs the generated address update request to the address converter 115 (S84).

The address converter 115 performs an address update process described above based on the address update request received from the UNMAP processor 114 (S85). In this case, the address converter 115 updates the address conversion table 191 so as to dissolve the correspondence relationship between the logical address included in the address update request and the existing physical address of the NAND 190. For example, the address converter 115 updates the physical address of the address conversion table (cache) 151 with the reserved number indicating the UNMAPPED state, and updates the address conversion table 191 in the NAND 190 based on the updated address conversion table (cache) 151.

When the address converter 115 completes the address update process, the address converter 115 outputs a completion notification indicating that the address update process is completed to the UNMAP processor 114 (S86). The UNMAP processor 114 deletes the logical address at which the UNMAP processing has been performed from the UNMAP table based on the completion notification received from the address converter 115 (S87).

As explained above, the UNMAP processor 114 stores the logical address included in the UNMAP command into the DRAM 150 based on the UNMAP command received from the host 200, and notifies the host 200 of the completion of the UNMAP command. The UNMAP processor 114 generates an address update request to dissolve the correspondence relationship between the logical address stored in the DRAM 150 and the existing physical address. The address converter 115 generates the first read request and the second read request based on one or more address update requests. The pairer 117 pairs the first read request with the second read request to generate the multi-plane read request. The NANDC 118 outputs the multi-plane read request to the NAND 190 and reads the address conversion table from the NAND 190. The address converter 115 updates the read address conversion table.

In the address updating process of step S85, since the multi-plane read that pairs a plurality of table read requests is performed, it is possible to improve throughput. Therefore, the UNMAP processor 114 can improve the throughput of the background UNMAP process.

The UNMAP processor 114 transmits the completion notification to the host 200 when the logical address is stored into the UNMAP table instead of when the UNMAP processing in the address conversion table is completed. The UNMAP processing is executed in the background in order to speed up apparent processing completion.

According to the background UNMAP processing illustrated in FIG. 14, a total number of the address update requests in flight generated by the UNMAP commands is not limited by a queue depth (QD) of the UNMAP commands, where the QD of the UNMAP commands is a total number (upper limit) of UNMAP commands that can be transmitted at a time from the host 200 to the storage device 100. The UNMAP processor can thus accommodate a large number of address update requests, not limited by the QD of the UNMAP commands, so that the pairer can achieve a high probability of paring the table read requests.

As described above, in the first embodiment, the classifier 116 classifies a plurality of read requests for reading data from the NAND 190 into a first read request for reading data from the first address of the first plane PL-1 and a second read request for reading data from the second address of the second plane PL-2. The first address and the second address may be different. The pairer 117 pairs the first read request with the second read request to generate a multi-plane read request. The NANDC 118 outputs the multi-plane read request to the NAND 190 to read data in parallel from the NAND 190. Accordingly, the storage device 100 can improve throughput.

Further, the controller 110 generates a table read request for reading of a portion of the address conversion table from the NAND 190. The classifier 116 classifies the table read request into the first read request and the second read request. The pairer 117 pairs the first read request with the second read request to generate a multi-plane read request. The controller 110 generates a table read request based on the user data read request. The NANDC 118 outputs the multi-plane read request to the NAND 190 to read a portion of the address conversion table stored in the NAND 190. The address converter 115 acquires the physical address from a portion of the address conversion table. In this embodiment, even when the table read request frequently occurs, performance degradation of the storage device resulting from the table read is mitigated by performing the multi-plane read.

Second Embodiment

In the first embodiment, the classifier 116 classifies a plurality of read requests for reading data from the NAND 190 into the first read request for reading data from the first plane PL-1, and the second read request for reading data from the second plane PL-2. In the second embodiment, the classifier 116 classifies the plurality of read requests for reading data from the NAND 190, further, based on the read time. The read time is a time required for the sense amplifier 194 to sense data in a memory cell array 193 into the page buffer 195. Hereinafter, the second embodiment will be described in detail.

Figure 15:
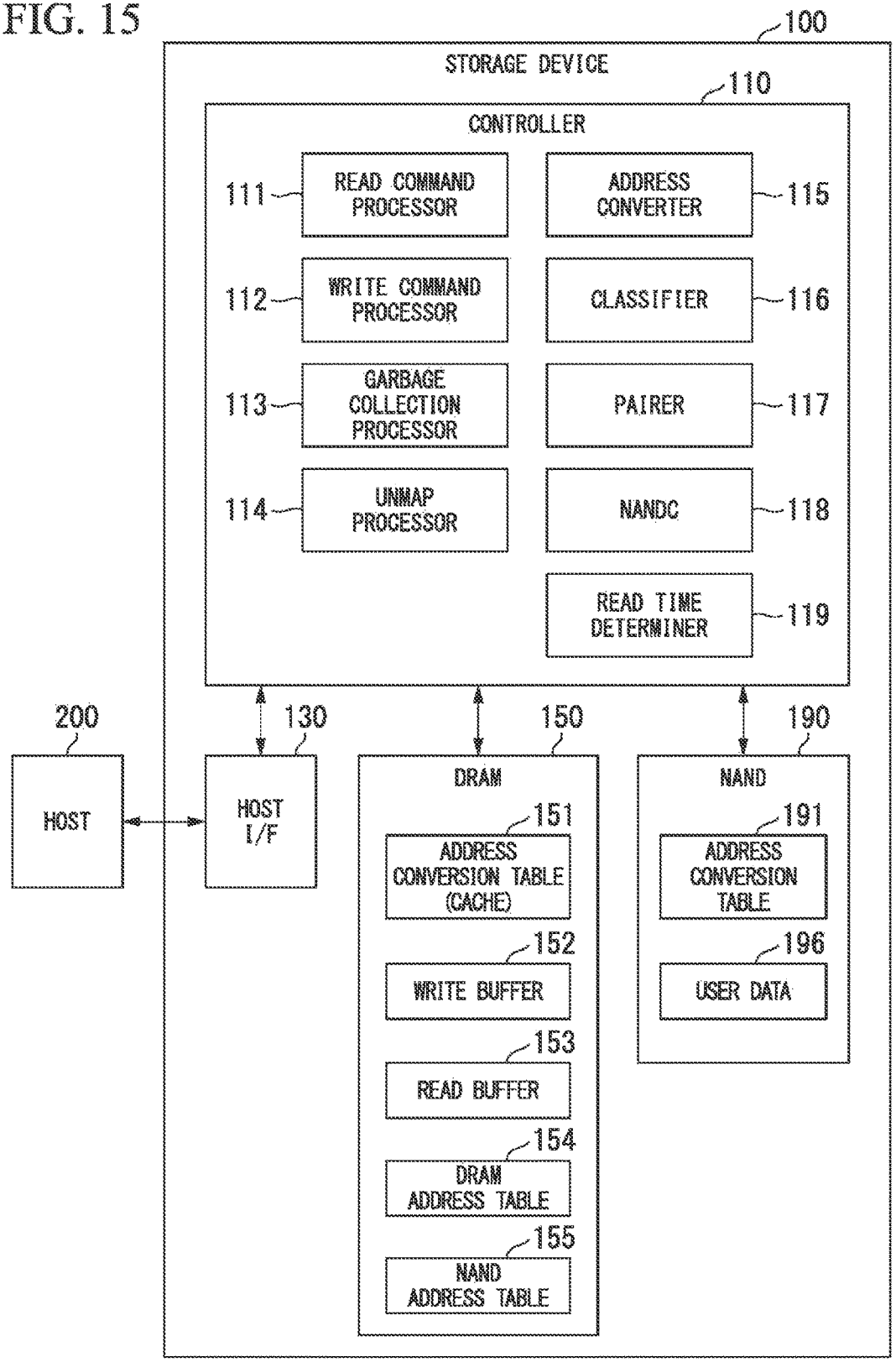
FIG. 15 is a diagram illustrating an example of a storage device according to a second embodiment.

FIG. 15 is a diagram illustrating an example of a storage device in the second embodiment. Differences between FIG. 1 and FIG. 15 will be mainly described. The controller 110 includes a read time determiner 119. Details will be described below, and the read time determiner 119 determines the read time for each of a plurality of read requests. For example, the read time determiner 119 may determine the read time of the address conversion table 191 and the read time of the user data 196.

The read time determiner 119 is realized by a processor such as a central processing unit (CPU) executing a program stored in a program memory. The read time determiner 119 may be realized by hardware such as an LSI, an ASIC, and a FPGA having the same function as the function of the processor executing the program.

Figure 16:
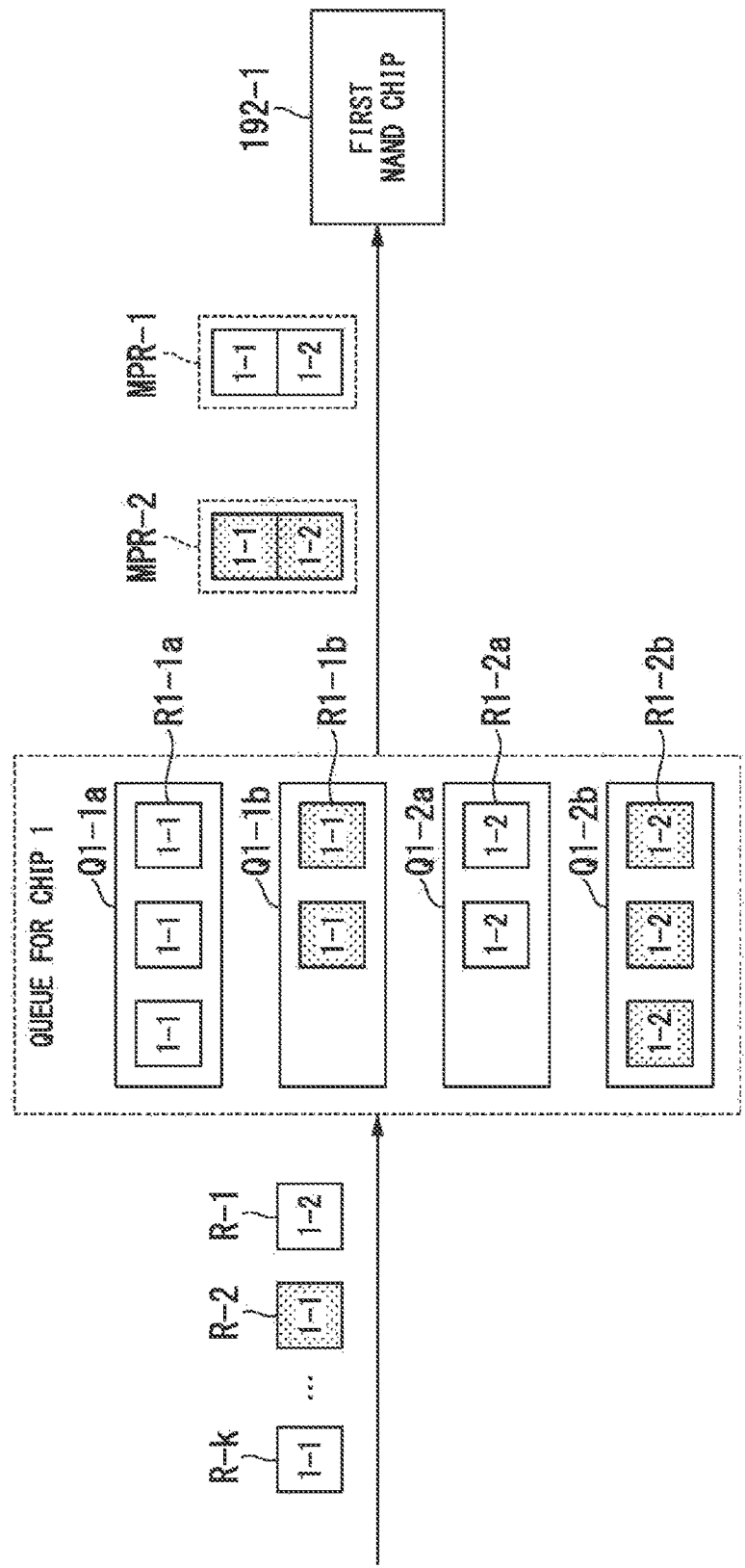
FIG. 16 is a diagram illustrating an example of forming a multi-plane read command in the second embodiment.

FIG. 16 is a diagram illustrating an example of a multi-plane read in the second embodiment. For example, when an address resolution request or an address update request described above is input to the address converter 115, the address converter 115 generates a plurality of table read requests R-1 to R-k (k is a natural number).

The classifier 116 classifies a plurality of table read requests R-1 to R-k generated by the address converter 115 into requests of a plurality of NAND chips 192. Although only a first NAND chip 192-1 is illustrated in order to simplify the description in FIG. 16, a plurality of NAND chips may be provided in the NAND 190.

The classifier 116 classifies the plurality of table read requests for the NAND chip 192-1 into a table read request R1-1 for reading data from the first plane PL-1 and a table read request R1-2 for reading data from the second plane PL-2.

The read time determiner 119 determines the read time for each of the table read request R1-1 and the table read request R1-2. For example, a recording (programming) scheme for a first block (that stores user data in the first plane PL-1, for example) and a recording scheme for a second block (that stores system data in the second plane PL-2, for example) may be different from each other. The read time determiner 119 accordingly may determine the read time based on the recording scheme of the memory cell of the NAND 190. For example, the read time determiner 119 may determine the read time based on whether the recording scheme for memory cells is a single level cell (SLC) or a multi-level cell (MLC). The SLC is a memory cell in which one-bit data is recorded, and the MLC is a memory cell in which two or more-bit data is recorded.

Figure 17:
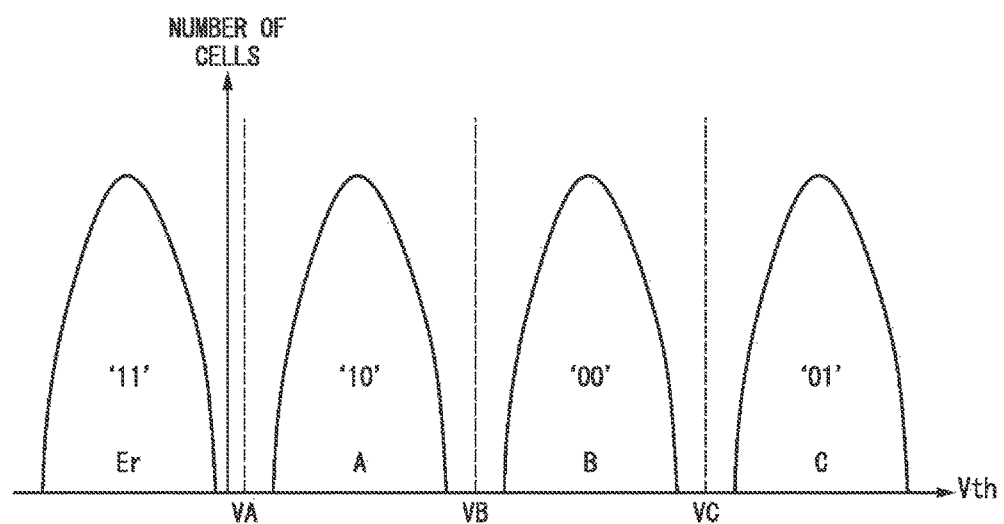
FIG. 17 is a diagram illustrating an example of a distribution of threshold voltages of memory cells in which an MLC recording scheme is employed.

FIG. 17 is a diagram illustrating an example of a distribution of threshold voltages of memory cells for which a recording method is MLC. As illustrated in FIG. 17, in a case where one memory cell holds two bits of data, four threshold voltage modes are formed. The data held in one memory cell in this embodiment is not limited to two bits and may consist of three or more bits. '11', '10', '00', and '01' are assigned to four threshold voltage modes illustrated in FIG. 17 in order of ascending threshold voltages. The two bits of data indicate 'upper/lower', respectively. The four threshold voltage modes correspond to the Er (erased) state, the A state, the B state, and the C state sequentially.

At the time of data reading, one or more read voltages VA, VB, and VC are applied, and it is determined which data among '11', '10', '00', and '01' the memory cell holds. For example, in a case where data is read from the MLC (upper page), a read voltage VB is applied. On the other hand, in a case where data is read from the MLC (lower page), it is necessary to apply the read voltages VA and VC sequentially. Therefore, a read time required to read the data from the MLC (upper page) is shorter than a read time required to read data from the MLC (lower page).

For example, in a case where data is read from the SLC, the read time of the data is about 40 µs. In a case where data is read from the MLC (upper page), the read time of the data is about 50 µs. In a case where data is read from the MLC (lower page), the read time of the data is about 80 µs. As described above, in the case of the MLC, the data in the MLC (upper page) and the data in the MLC (lower page) are individually read by switching the read voltages.

As explained above, the read time of the MLC is longer than that of the SLC. Accordingly, the read time determiner 119 may determine the read time based on the recording scheme of the memory cells of the NAND 190 in which the data read based on the table read request is stored.

Further, as illustrated in FIG. 17, in a case where the data is read from the MLC (lower page) using two levels (VA and VC) and data is read from the MLC (upper page) using one level (VB), the read time of the MLC (lower page) is longer than the read time of the MLC (upper page). In coding (bit assignment) different from this, in a case where data is read from the MLC (upper page) using two levels and data is read from the MLC (lower page) using one level, the read time of the MLC (lower page) is shorter than the read time of the MLC (upper page). Thus, the read time of the MLC (lower page) and the read time of the MLC (upper page) differ from each other due to the coding scheme. Accordingly, the read time determiner 119 may determine the read time based on the page address (upper page or lower page) of the data that is read based on the table read request.

Examples of a sequence for writing data to the MLC (lower page) and the MLC (upper page) include a full sequence and an LM sequence. The full sequence is a sequence in which writing data to the MLC (lower page) for a word line and writing data to the MLC (upper page) for the word line are performed in succession or at once. On the other hand, the LM sequence is a sequence in which the writing of data to the MLC (lower page) for one word line and the writing of data to the MLC (upper page) are not continuously performed in order to reduce program disturbance.

FIG. 18 is a diagram illustrating page addressing in the full sequence of the MLC, and FIG. 19 is a diagram illustrating page addressing in the LM sequence of the MLC. In FIGS. 18 and 19, 128 word lines from 0 to 127 are illustrated as an example, but the number of word lines is not limited thereto. In the full sequence illustrated in FIG. 18, the page address increases in an order of a lower page of word line 0, an upper page of word line 0, a lower page of word line 1, an upper page of word line 1, . . . . On the other hand, in the LM sequence illustrated in FIG. 19, the page address increases in an order of a lower page of word line 0, a lower page of word line 1, an upper page of the word line 0, a lower page of word line 2, . . . . The read time determiner 119 determines lower/upper of the page based on the write sequence and the page address, and determines the read time based on a result of the determination of a lower page or an upper page.

Further, a triple level cell (TLC) may be used as a recording scheme of the memory cell. The TLC is a memory cell in which 3-bit data is recorded. Examples of the sequence for writing data to TLC (lower page), TLC (middle page), and TLC (upper page) include a full sequence and a foggy-fine sequence. The full sequence is a sequence in which writing of data to the TLC (lower page) for one word line, writing of data to the TLC (middle page), and writing of data to the TLC (upper page) are continuously performed. On the other hand, the foggy-fine sequence is a sequence in which writing of data to the TLC (lower page) for one word line, writing of data to the TLC (middle page), and writing of data to the TLC (upper page) are not continuously performed in order to reduce program disturbance.

FIG. 20 is a diagram illustrating page addressing in the full sequence of the TLC, and FIG. 21 is a diagram illustrating page addressing in the foggy-fine sequence of the TLC. In FIGS. 20 and 21, 128 word lines from 0 to 127 are illustrated as an example, but the number of word lines is not limited thereto. In the full sequence illustrated in FIG. 20, the page address increases in an order of a lower page of word line 0, a middle page of word line 0, an upper page of word line 0, a lower page of word line 1, a middle page of word line 1, an upper page of word line 1, . . . . On the other hand, in the foggy-fine sequence illustrated in FIG. 21, the page address increases in an order of a lower page of word line 0, a lower page of word line 1, a middle page of word line 0, a lower page of word line 2, a middle page of word line 1, an upper page of the word line 0, . . . . The read time determiner 119 determines lower/middle/upper of the page based on the write sequence and the page address, and determines the read time based on a result of the determination of a lower page, a middle page, or an upper page.

The classifier 116 classifies the table read request R1-1 for reading data from the first plane PL-1 into a table read request R1-1a for which the read time is less than a predetermined time and a table read request R1-1b for which the read time is equal to or more than the predetermined time based on the read time determined by the read time determiner 119. The predetermined time may be, for example, 60 µs, but is not limited thereto.

Similarly, the classifier 116 classifies the table read request R1-2 for reading data from the second plane PL-2 into a table read request R1-2a for which the read time is less than a predetermined time and a table read request R1-2b for which the read time is equal to or more than the predetermined time based on the read time determined by the read time determiner 119.

The classifier 116 stores the table read request R1-1a in a queue Q1-1a (first queue), stores the table read request R1-1b in a queue Q1-1b (second queue), stores the table read request R1-2a in a queue Q1-2a (third queue), and stores the table read request R1-2b in a queue Q1-2b (fourth queue). Each of the queue Q1-1a, the queue Q1-1b, the queue Q1-2a, and the queue Q1-2b is a FIFO (First In, First Out) queue and is provided in the DRAM 150.

For example, as illustrated in FIG. 16, the table read request R-1 is a table read request for reading data from the second plane PL-2 of the first NAND chip 192-1, the table read request R-2 is a table read request for reading data from the first plane PL-1 of the first NAND chip 192-1, and the table read request R-k is a table read request for reading data from the first plane PL-1 of the first NAND chip 192-1. Further, the read time of the table read request R-1 is less than the predetermined time, the read time of the table read request R-2 is equal to or more than the predetermined time, and the read time of the table read request R-k is less than the predetermined time. Therefore, the table read request R-1 is stored in the queue Q1-2a, the table read request R-2 is stored in the queue Q1-1b, and the table read request R-k is stored in the queue Q1-1a.

The pairer 117 pairs the table read request R1-1*a* stored in the queue Q1-1*a* with the table read request R1-2*a* stored in the queue Q1-2*a* to generate a multi-plane read request MPR-1. The pairer 117 outputs the generated multi-plane read request MPR-1 to the NANDC 118. The NANDC 118 outputs the multi-plane read request MPR-1 received from the pairer 117 to the first NAND chip 192-1.

When the multi-plane read request MPR-1 is input to the first NAND chip 192-1, the first NAND chip 192-1 reads data corresponding to one page from the memory cell array 193-1 based on the NAND address included in the paired table read request R1-1*a* and reads data corresponding to one page from the memory cell array 193-2 based on the NAND address included in the paired table read request R1-2*a*. The first NAND chip 192-1 outputs the read data to the NANDC 118. The NANDC 118 outputs the data received from the first NAND chip 192-1 to the address converter 115.

Similarly, the pairer 117 pairs the table read request R1-1*b* stored in the queue Q1-1*b* with the table read request R1-2*b* stored in the queue Q1-2*b* to generate a multi-plane read request MPR-2. The pairer 117 outputs the generated multi-plane read request MPR-2 to the NANDC 118. The NANDC 118 outputs the multi-plane read request MPR-2 received from the pairer 117 to the first NAND chip 192-1.

When the multi-plane read request MPR-2 is input to the first NAND chip 192-1, the first NAND chip 192-1 reads data corresponding to one page from the memory cell array 193-1 based on the NAND address included in the paired table read request R1-1*b* and reads data corresponding to one page from the memory cell array 193-2 based on the NAND address included in the paired table read request R1-2*b*. The first NAND chip 192-1 outputs the read data to the NANDC 118. The NANDC 118 outputs the data received from the first NAND chip 192-1 to the address converter 115.

As explained above, the NANDC 118 outputs the multi-plane read request generated by the pairer 117 to the NAND 190. By performing the multi-plane read that pairs a plurality of read requests, the NAND 190 can read data in parallel from a plurality of planes. Therefore, it is possible improve throughput, in comparison with performing the single-plane read multiple times, which transmits read requests to the NAND 190 one by one.

By contrast, in a case where the table read request for which the read time is less than the predetermined time and the table read request for which the read time is equal to or more than the predetermined time are paired, the read time of the multi-plane read request results in a read time equal to or more than the predetermined time, and read performance may be degraded. To avoid this situation, in this embodiment, the pairer 117 pairs the table read requests for which the read time is less than the predetermined time, or pairs the table read requests for which the read time is equal to or more than the predetermined time. Accordingly, the storage device of the second embodiment can further shorten the read time for the NAND 190.

In the first embodiment and the second embodiment, the pairer 117 pairs a plurality of table read requests to generate the multi-plane read request, but the present invention is not limited thereto. For example, the address converter 115 may generate the table read request based on the read command received from the host 200. Further, the read command processor 111 may generate the user data read request for reading the user data 196 from the NAND 190 and the address converter 115 may generate the table read request based on the user data read request. Further, the pairer 117 pairs the table read request with the user data read request to generate the multi-plane read request. In the first embodiment and the second embodiment, the read command processor 111 may generate the first user data read request for reading the user data 196 from the NAND 190 and the second user data read request different from the first user data read request for reading the user data 196 from the NAND 190 based on one or more read commands received from the host 200. Further, the pairer 117 may pair the first user data read request with the second user data read request to generate the multi-plane read request.

Further, in the first embodiment and the second embodiment, the address converter 115 may generate the table read request based on the read command received from the host 200. Further, the read command processor 111 may generate the user data read request for reading the user data from the NAND 190 based on the read command. Further, the pairer 117 may perform a pairing of a plurality of table read requests in preference to the pairing of a plurality of user data read requests. Since a physical address must be provided in a user read request, the corresponding table read is performed prior to the user read. By processing the table read requests in preference to the user data requests, the number of read commands in flight can be large, resulting in a high throughput due to a high parallelism. By contrast, if the table read requests are processed in a low priority, the number of read commands in flight becomes small, which results in a low throughput.

According to at least one of the embodiments described above, the storage device 100 includes the NAND 190, the classifier 116, the pairer 117, and the NANDC 118. The NAND 190 is a nonvolatile memory, and includes the first plane PL-1 and the second plane PL-2 for storing data. The classifier 116 classifies the plurality of read requests for reading data from the NAND 190 into the first read request for reading data from the first plane PL-1 and the second read request for reading data from the second plane PL-2. The pairer 117 pairs the first read request and the second read request classified by the classifier 116 to generate the multi-plane read request. The NANDC 118 outputs the multi-plane read request generated by the pairer 117 to the NAND 190 to read the data from the NAND 190.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device, comprising:
a nonvolatile semiconductor memory having a first physical region and a second physical region, and configured to store an address conversion table that is used to convert a logical address into a physical address of the nonvolatile semiconductor memory; and
a controller configured to:
determine a read time for each of a plurality of read requests for reading data from the nonvolatile memory;
classify the plurality of read requests into first read requests for reading data from the first physical region and second read requests for reading data from the second physical region;

pair, on the basis of the determined lengths of time, one of the first read requests with one of the second read requests to generate a third read request, such that the determined read time for said one of the first read requests and the determined read time for said one of the second read requests are both shorter than a threshold;

output the third read request to the nonvolatile semiconductor memory; and generate one or more first address update requests for updating a correspondence relationship between a logical address and a physical address of the nonvolatile semiconductor memory, wherein the controller is further configured to:

generate a table read request, as one of the plurality of read requests to be classified into one of the first and second read requests, for an address resolution process to convert a logical address of data stored in a first block of the nonvolatile semiconductor memory into a first physical address;

determine whether or not the data stored in the first block is valid on the basis of the address resolution process;

copy the data determined to be valid in the first block of the nonvolatile semiconductor memory to a second block of the nonvolatile semiconductor memory, the second block being associated with a second physical address; and generate a second address update request as one of the one or more first address update requests for updating a correspondence relationship for the logical address of the data copied to the second block from the first physical address to the second physical address.

2. The storage device according to claim 1, wherein the nonvolatile semiconductor memory performs a read operation in the first physical region in parallel with a read operation in the second physical region in response to the third read request.

3. The storage device according to claim 2, wherein the first physical region includes a first plane of memory cells and the second physical region includes a second plane of memory cells, and the third read request is a multi-plane read request.

4. The storage device according to claim 1, further comprising:

an interface through which a plurality of commands for accessing the nonvolatile semiconductor memory is received from a host device, wherein the controller is configured to generate the first read requests and the second read requests on the basis of the plurality of commands received through the interface, and to store the first read requests in a first queue and to store the second read requests in a second queue.

5. The storage device according to claim 1, wherein the controller is configured to store the first read requests in first and second queues according to the determined lengths of time for the first read requests and to store the second read requests in third and fourth queues according to the determined lengths of time for the second read requests, wherein:

the first read requests for which the determined read time is shorter than a first read time are stored in the first queue;

the first read requests for which the determined read time is equal to or longer than the first read time are stored in the second queue;

the second read requests for which the determined read time is shorter than the first read time are stored in the third queue; and the second read requests for which the determined read time is equal to or longer than the first read time are stored in the fourth queue.

6. The storage device according to claim 5, wherein the third request includes a pair of either (A) one of the first read requests in the first queue and one of the second read requests in the third queue, or (B) one of the first read requests in the second queue and one of the second read requests in the fourth queue.

7. The storage device according to claim 1, wherein the controller is configured to determine the read time on the basis of a recording scheme for memory cells of the nonvolatile semiconductor memory from which data are read based on the first read requests or the second read requests.

8. The storage device according to claim 7, wherein the recording scheme for memory cells includes a single-level cell recording scheme and a multi-level cell recording scheme.

9. The storage device according to claim 7, wherein the nonvolatile semiconductor memory includes a word line connecting the memory cells;

the recording scheme for the memory cells includes a multi-level cell recording scheme that records a plurality of pages of data in the memory cells connected to the word line; and the controller is configured to determine the read time on the basis of which page among the plurality of pages is to be read by the first read requests or the second read requests.

10. The storage device according to claim 1, wherein the controller is configured to determine the read time on the basis of a page address of data that is read on the basis of the first read requests or the second read requests.

11. The storage device according to claim 1, wherein the controller is further configured to generate another table read request, as one of the plurality of read requests to be classified as one of the first and second read requests, for reading a portion of the address conversion table from the nonvolatile semiconductor memory.

12. The storage device according to claim 11, wherein the controller is configured to generate the another table read request on the basis of a read command received from a host device, and a user data read request for reading user data from the nonvolatile semiconductor memory on the basis of a read command received from the host device, and the third read request includes the another table read request and the user data read request.

13. The storage device according to claim 1, wherein the controller is further configured to:

generate a plurality of table read requests, each as one of the plurality of read requests to be classified as one of the first and second read requests, for reading portions of the address conversion table from the nonvolatile semiconductor memory;

generate a first user data read request for reading user data from the nonvolatile semiconductor memory and a second user data read request, which is different from the first user data read request, for reading user data from the nonvolatile semiconductor memory, on the basis of one or more read commands received from a host device;

pair at least two of the table read requests to generate the third read request or pair the first and second user data read requests to generate the third read request; and output, as the third read request, the paired table read requests with higher priority than the paired first and second user data read requests, to the nonvolatile semiconductor memory.

14. The storage device according to claim 1, wherein the controller is further configured to:

generate an address resolution request for converting a logical address of data stored in the nonvolatile semiconductor memory into a first physical address;

for the address resolution request, generate another table read request, as one of the plurality of read requests to be classified as one of the first and second read requests, for reading a portion of the address conversion table from the nonvolatile semiconductor memory; and determine whether or not the data stored in the nonvolatile semiconductor memory is valid on the basis of the first physical address and a second physical address, the second physical address being read from a log that describes a correspondence between logical addresses and physical addresses of data stored in the nonvolatile semiconductor memory.

15. The storage device according to claim 1, wherein the nonvolatile semiconductor memory includes a memory cell array and a page buffer, and the read time is equal to a time required to store data read from the memory cell array into the page buffer.

16. A storage device, comprising:

a nonvolatile semiconductor memory having a first physical region and a second physical region, and configured to store an address conversion table that is used to convert logical addresses into physical addresses of the nonvolatile semiconductor memory; and a controller configured to store user data in a buffer memory in response to a write command associated with a logical address and user data, received from a host, and notify the host of completion of the write command, wherein subsequent to notifying the host of completion of the write command, the controller writes the user data stored in the buffer memory into the nonvolatile semiconductor memory at a physical address, and generates one or more first address update requests for updating a correspondence relationship between the logical address and the physical address for the user data, and the controller generates table read requests for reading portions of the address conversion table from the nonvolatile semiconductor memory in response to the one or more first address update requests, classifies the table read requests as first requests for reading data from the first physical region and second read requests for reading data from the second physical region, pairs one of the first read requests with one of the second read requests to generate a third read request, and outputs the third read request to the nonvolatile semiconductor memory, and wherein the controller is further configured to:

generate the table read requests for an address resolution process to convert a logical address of data stored in a first block of the nonvolatile semiconductor memory into a first physical address;

determine whether or not the data stored in the first block is valid on the basis of the address resolution process;

copy the data determined to be valid in the first block of the nonvolatile semiconductor memory to a second block of the nonvolatile semiconductor memory, the second block being associated with a second physical address; and generate a second address update request as one of the one or more first address update requests for updating a correspondence relationship for the logical address of the data copied to the second block from the first physical address to the second physical address.

17. The storage device according to claim 16, further comprising:

a second memory, wherein the controller is further configured to:

cache a portion of the address conversion table in the second memory, and update the cached portion of the address conversion table in the second memory on the basis of the address conversion table that is read from the nonvolatile semiconductor memory in response to the third read request.

18. The storage device according to claim 16, wherein the controller is further configured to:

generate a third address update request, as one of the one or more first address update requests, for updating the correspondence relationship between a logical address and a physical address of the nonvolatile semiconductor memory, the logical address being included in an UNMAP command received from the host.

19. A storage device, comprising:

a nonvolatile semiconductor memory having a first physical region and a second physical region, and configured to store an address conversion table that is used to convert a logical address into a physical address of the nonvolatile semiconductor memory; and a controller configured to:

classify a plurality of read requests into first read requests for reading data from the first physical region and second read requests for reading data from the second physical region;

generate one or more table read requests as one of the first and second read requests, for reading one or more portions of the address conversion table from the nonvolatile semiconductor memory;

pair one of the first read requests with one of the second read requests to generate a third read request;

output the third read request to the nonvolatile semiconductor memory; and generate one or more first address update requests for updating a correspondence relationship between a logical address and a physical address of the nonvolatile semiconductor memory, wherein the controller is further configured to:

write first data, which is associated with a first logical address and received from a host, at a first physical address of the nonvolatile semiconductor memory;

output the third read request to the nonvolatile semiconductor memory to read one or more portions of the address conversion table from the nonvolatile semiconductor memory;

update the one or more read portions of the address conversion table to map the first logical address to the first physical address;

generate a table read request, as one of the plurality of read requests to be classified into one of the first and second read requests, for an address resolution process to convert a logical address of second data stored in a first block of the nonvolatile semiconductor memory into a second physical address;

determine whether or not the second data stored in the first block is valid on the basis of the address resolution process;

copy the second data determined to be valid in the first block of the nonvolatile semiconductor memory to a second block of the nonvolatile semiconductor memory, the second block being associated with a third physical address; and generate a second address update request as one of the one or more first address update requests for updating a correspondence relationship for the logical address of the second data copied to the second block from the second physical address to the third physical address.

20. The storage device according to claim 19, wherein the controller is configured to generate one of the table read requests on the basis of a read command received from a host device, and a user data read request for reading user data from the nonvolatile semiconductor memory on the basis of a read command received from the host device, and the third read request includes the one of the table read requests and the user data read request.

21. The storage device according to claim 19, wherein the controller is further configured to:

generate a first user data read request for reading user data from the nonvolatile semiconductor memory and a second user data read request, which is different from the first user data read request, for reading user data from the nonvolatile semiconductor memory, on the basis of one or more read commands received from a host device;

pair at least two of the table read requests to generate the third read request or pair the first and second user data read requests to generate the third read request; and output, as the third read request, the paired table read requests with higher priority than the paired first and second user data read requests, to the nonvolatile semiconductor memory.

22. The storage device according to claim 19, wherein the controller is further configured to:

generate an address resolution request for converting a logical address of third data stored in the nonvolatile semiconductor memory into a fourth physical address;

generate another table read request for the address resolution request; and determine whether or not the third data stored in the nonvolatile semiconductor memory is valid on the basis of the fourth physical address and a fifth physical address, the fifth physical address being read from a log that describes a correspondence between logical addresses and physical addresses of data stored in the nonvolatile semiconductor memory.

23. The storage device according to claim 19, wherein the controller is further configured to:

in a case where the controller cannot pair said one of the first read requests with said one of the second read requests within a certain time, output said one of the first read requests to the nonvolatile semiconductor memory.

* * * * *